(12) United States Patent
Klingbeil et al.

(10) Patent No.: US 11,585,264 B2
(45) Date of Patent: Feb. 21, 2023

(54) METHODS AND SYSTEMS FOR AFTERTREATMENT PERFORMANCE

(71) Applicant: Transportation IP Holdings, LLC, Norwalk, CT (US)

(72) Inventors: Adam Edgar Klingbeil, Ballston Lake, NY (US); Thomas Michael Lavertu, Ballston Lake, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/356,265

(22) Filed: Jun. 23, 2021

(65) Prior Publication Data

US 2022/0412250 A1 Dec. 29, 2022

(51) Int. Cl.
| | |
|---|---|
| F02B 37/10 | (2006.01) |
| F02D 41/14 | (2006.01) |
| F02D 41/06 | (2006.01) |
| F02B 63/04 | (2006.01) |
| F02D 41/00 | (2006.01) |
| F02B 37/12 | (2006.01) |

(52) U.S. Cl.
CPC .............. *F02B 37/10* (2013.01); *F02B 37/12* (2013.01); *F02B 63/042* (2013.01); *F02D 41/0047* (2013.01); *F02D 41/068* (2013.01); *F02D 41/1454* (2013.01); *F01N 2900/1402* (2013.01); *F01N 2900/1404* (2013.01); *F02B 2037/122* (2013.01); *F02D 2200/0802* (2013.01)

(58) Field of Classification Search
CPC ........ F02B 37/10; F02B 37/12; F02B 63/042; F02B 2037/122; F02D 41/0047; F02D 41/068; F02D 41/1454; F02D 2200/0802; F01N 2900/1402; F01N 2900/1404
See application file for complete search history.

(56) References Cited

U.S. PATENT DOCUMENTS

| | | | |
|---|---|---|---|
| 10,100,764 B2 * | 10/2018 | Pappenheimer | .... F02D 41/0245 |
| 2006/0236692 A1 * | 10/2006 | Kolavennu | ............. F02B 39/10 60/599 |
| 2019/0234272 A1 * | 8/2019 | Harmsen | ................ F02M 26/04 |
| 2020/0165990 A1 * | 5/2020 | Heinisch | ................... F01N 3/10 |
| 2020/0256243 A1 * | 8/2020 | Blythe | .................... F02B 37/14 |

FOREIGN PATENT DOCUMENTS

JP          2004190579 A   *   7/2004

* cited by examiner

*Primary Examiner* — Audrey B. Walter
(74) *Attorney, Agent, or Firm* — McCoy Russell LLP

(57) ABSTRACT

Methods and systems are proposed for controlling a temperature of exhaust gases generated by the engine by operating an E-Turbo of the vehicle. In one embodiment, a method is provided, comprising increasing a power generated by an electric machine mechanically coupled with an exhaust turbine of an E-Turbo of a vehicle or adjusting an engine power based on a speed of the exhaust turbine and an air-fuel ratio (AFR) of an engine of the vehicle of the engine responsive to the speed of the exhaust turbine increasing above a threshold turbine speed. By increasing or decreasing the power generated by the electric machine and/or adjusting the engine power, the temperature of the exhaust gas may be maintained within a threshold temperature range where an efficiency of an aftertreatment system may be maximized, thereby reducing an emissions of the vehicle.

8 Claims, 8 Drawing Sheets

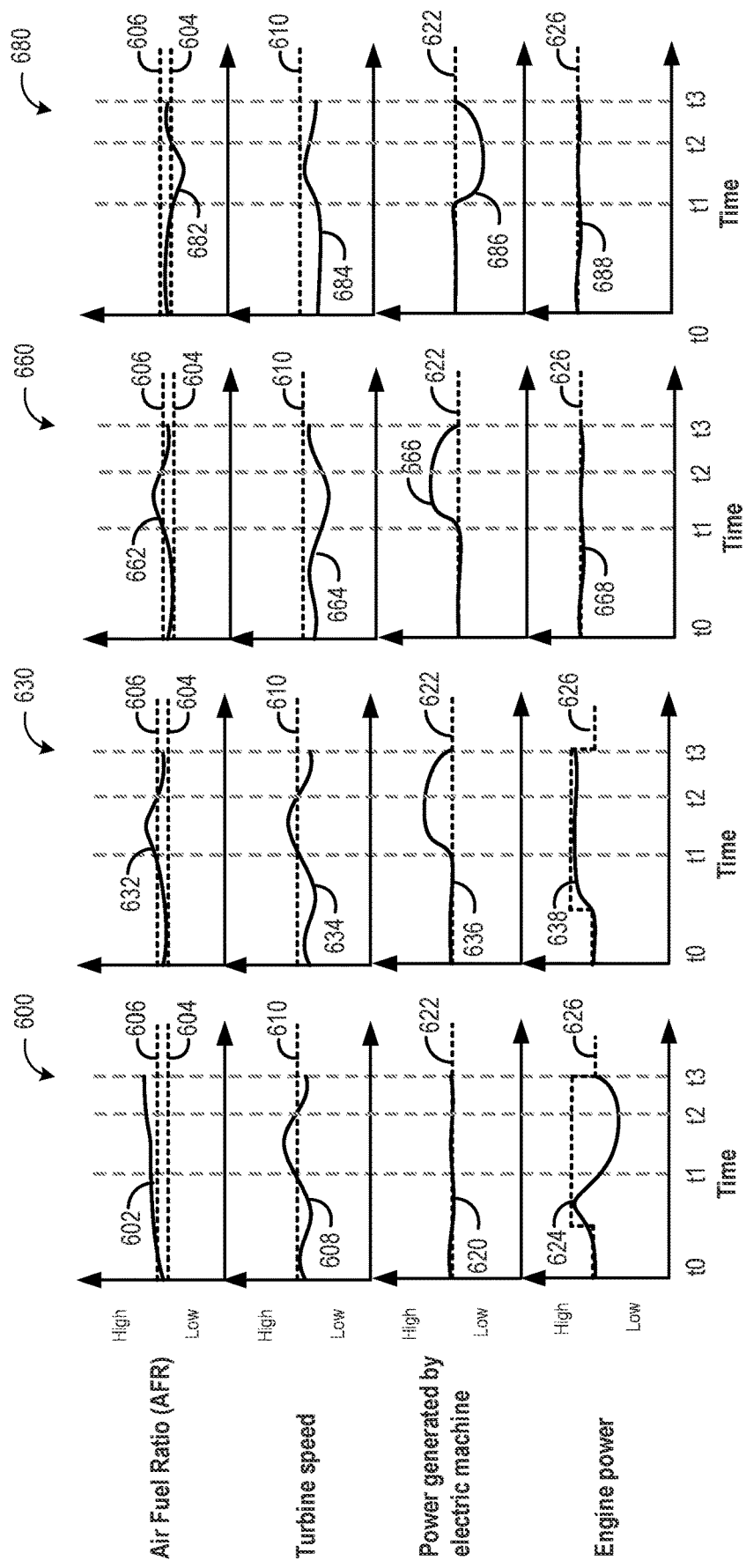

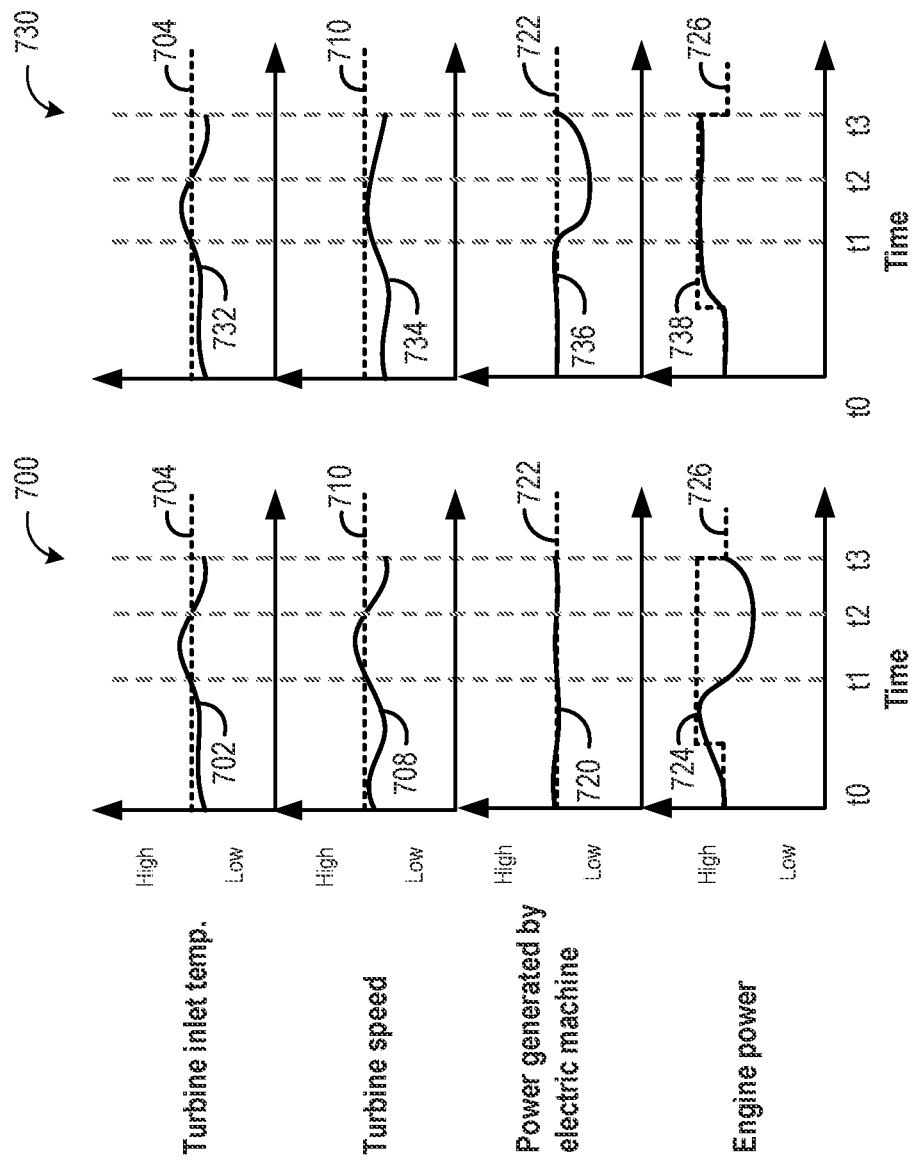

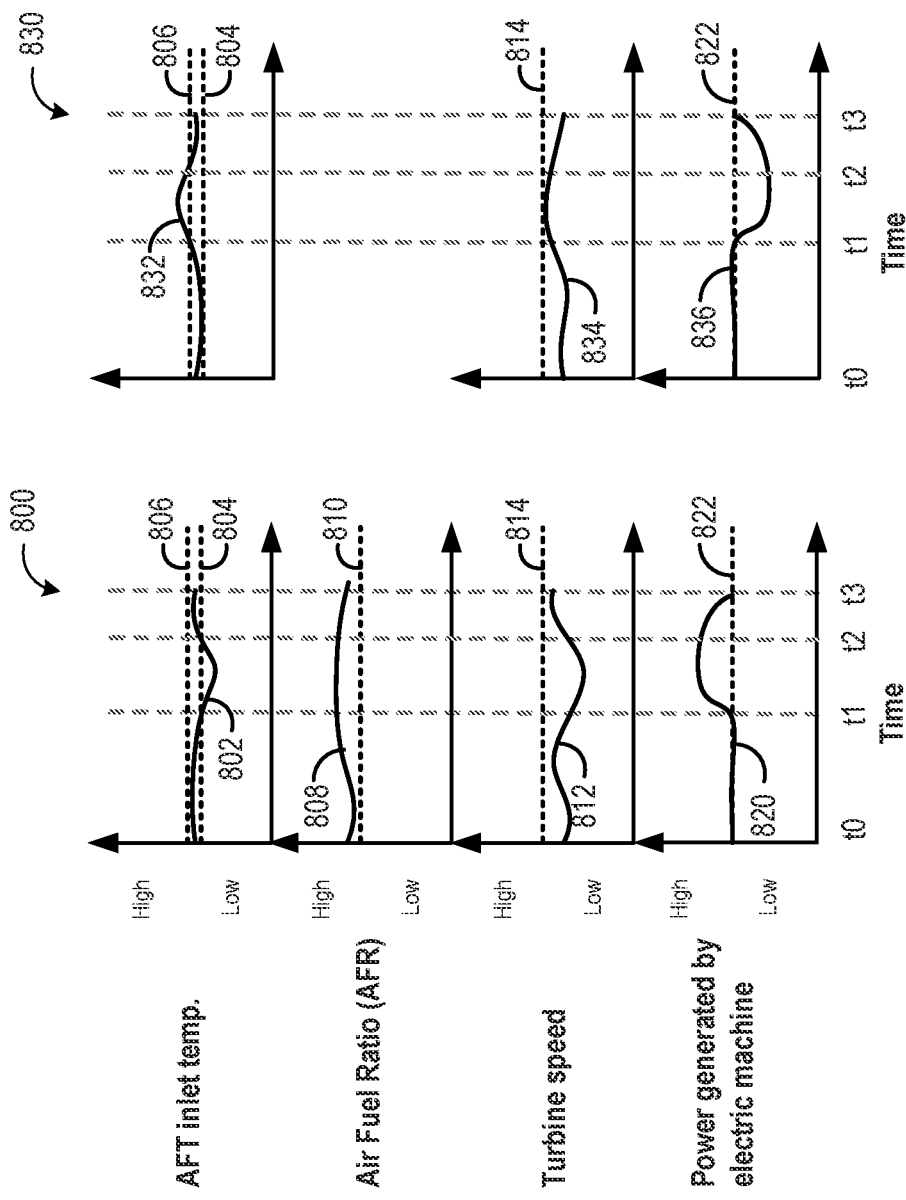

METHODS AND SYSTEMS FOR AFTERTREATMENT PERFORMANCE

BACKGROUND

Technical Field

Embodiments of the subject matter disclosed herein relate to turbocharged internal combustion engines, and more specifically, to increasing a performance of components of an exhaust system of an internal combustion engine of a vehicle by controlling a turbocharger of the vehicle.

Discussion of Art

Some vehicles with an internal combustion engine (also referred to simply as the engine) may use a turbocharger. One type of turbocharger is an E-Turbo. The E-Turbo differs from a regular turbocharger in that it may selectively extract energy from the flow of exhaust gases. On one hand, a turbine that is coupled to an electric machine may extract electrical energy. On the other hand, the exhaust gas flow may power a compressor turbine to provide compressed air to one or more cylinders of the engine. Compressing air in this manner may increase a power and torque of the engine.

An engine may be equipped with an exhaust gas aftertreatment system. The aftertreatment system may convert or capture certain exhaust gas constituents (e.g., NOx, CO, hydrocarbons, particulate matter, and the like) to inert or benign gases. Some examples of such exhaust gas aftertreatment systems include diesel particulate filters (DPF), diesel oxidation catalyst (DOC), lean NOx traps (LNT), ammonia slip, and selective catalyst reduction devices (SCR). Some exhaust gas aftertreatment systems exhibit high conversion efficiency within a relatively narrow temperature window. The temperature window may depend on, for example, the metal substrate or type of catalyst used. When exhaust gases flow through exhaust gas aftertreatment systems whose operating temperature is outside of the optimal temperature window, conversion efficiency may be lower than desired. It may be desirable to have a system and method that differs from those that are currently available.

BRIEF DESCRIPTION

In one embodiment, the current disclosure provides for a method comprising increasing a power generated by an electric machine mechanically coupled with an exhaust turbine of an E-Turbo of a vehicle or adjusting an engine power based on a speed of the exhaust turbine and an air-fuel ratio (AFR) of an engine of the vehicle of the engine responsive to the speed of the exhaust turbine increasing above a threshold turbine speed. For example, if the exhaust turbine speed exceeds the threshold turbine speed, a controller of the vehicle may derate the engine if the AFR falls below a first threshold AFR, or increase a power generated by the electric machine if the AFR increases above a second threshold AFR. Alternatively, if the exhaust turbine speed does not exceed the threshold turbine speed and the AFR falls below the first threshold AFR, the controller may decrease the power generated by the electric machine.

By increasing or decreasing a power generated by the electric machine and/or adjusting the engine power, an efficiency of the engine may be maximized; and/or a temperature of the exhaust gas may be maintained within a threshold temperature range where an efficiency of an aftertreatment system may be maximized, thereby reducing an emissions of the vehicle; or an overall efficiency of the vehicle may be maximized. For example, the energy extracted by the electric machine may be harvested by the vehicle for a fuel benefit, an alternative to active regeneration may be provided that consumes less fuel, and/or an amount of energy wasted as a result of post-injection may be recovered. An additional benefit of the method is that a rate of degeneration of one or more components of an exhaust system of the vehicle may be lowered.

BRIEF DESCRIPTION OF THE DRAWINGS

FIG. 6A is a timing diagram indicating a first example timing of operations performed to control a turbine of an E-Turbo in the first condition of FIG. 3.

FIG. 6B is a timing diagram indicating a second example timing of operations performed to control an E-Turbo in the first condition of FIG. 3.

FIG. 6C is a timing diagram indicating a third example timing of operations performed to control an E-Turbo in the first condition of FIG. 3.

FIG. 6D is a timing diagram indicating a fourth example timing of operations performed to control an E-Turbo in the first condition of FIG. 3.

FIG. 7A is a timing diagram indicating a first example timing of operations performed to control an E-Turbo in the second condition of FIG. 4.

FIG. 7B is a timing diagram indicating a second example timing of operations performed to control an E-Turbo in the second condition of FIG. 4.

FIG. 8A is a timing diagram indicating a first example timing of operations performed to control an E-Turbo in the third condition of FIG. 5.

FIG. 8B is a timing diagram indicating a second example timing of operations performed to control an E-Turbo in the third condition of FIG. 5.

DETAILED DESCRIPTION

This description and embodiments of the subject matter disclosed herein relate to methods and systems for increasing a performance of an internal combustion engine (ICE) of a vehicle. Methods and systems according to various embodiments may control a temperature of exhaust gases entering an aftertreatment system of the vehicle via an E-turbo of the vehicle where the exhaust gases are generated by the engine. By using an E-turbo to maintain the temperature of the exhaust gases in the aftertreatment system within a temperature range an efficiency of the aftertreatment system may be controlled.

Engine systems according to embodiments of the systems and methods disclosed herein may be suitable for use in mobile applications and stationary applications. Suitable stationary applications may include stationary power generation applications. Suitable mobile applications may include vehicles. Suitable vehicles may be used in the rail, mining, marine, aviation, trucking, automotive, and other industrial and agricultural market segments. A locomotive for the rail market is used herein for illustration purposes. A suitable rail market may use a locomotive for mainline freight haulage, passenger rail, switchers, shunters, and the like.

Figure 1:
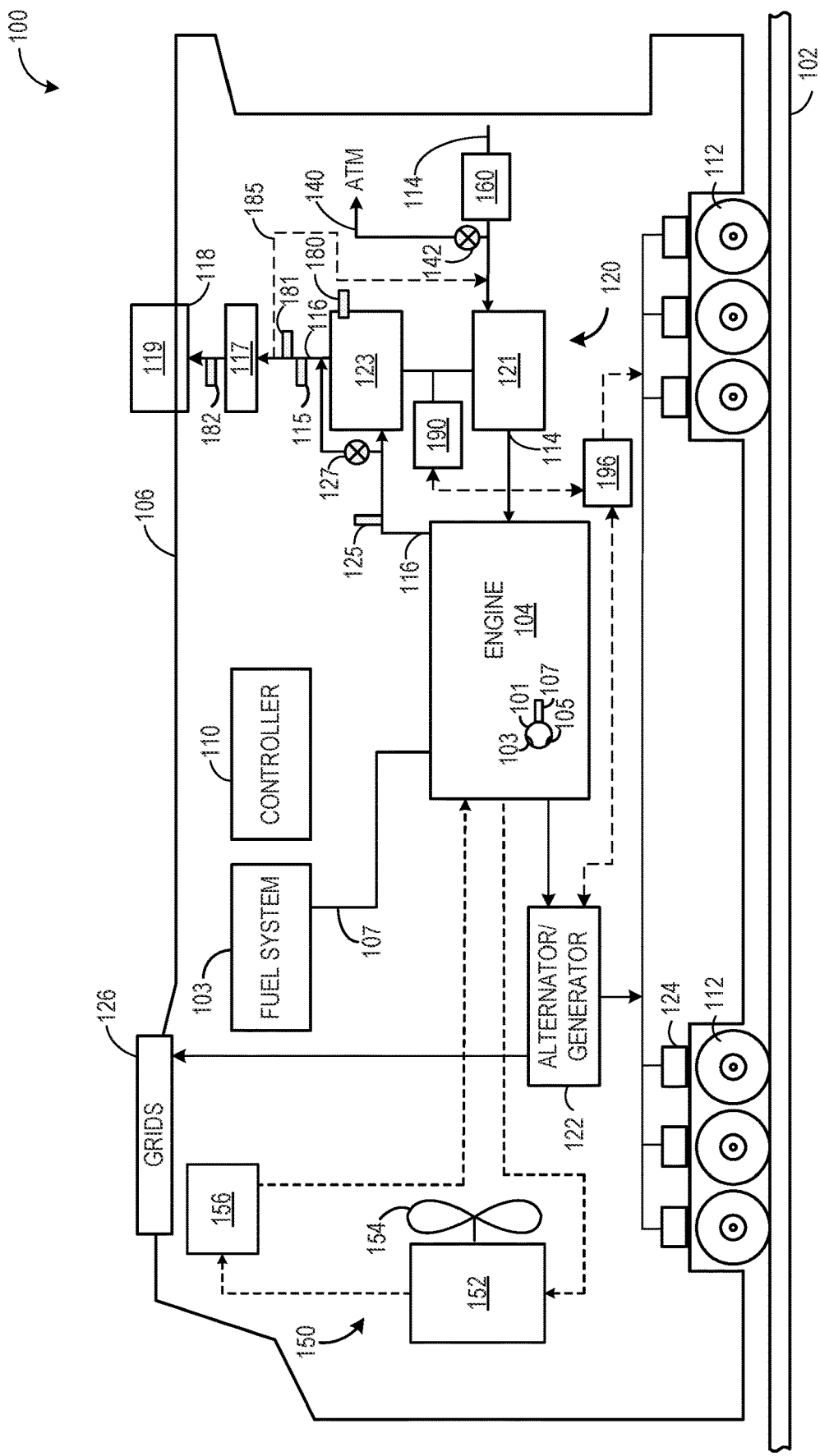
FIG. 1 shows a schematic diagram of a vehicle system with an engine, according to an embodiment of the present disclosure.
Figure 2:
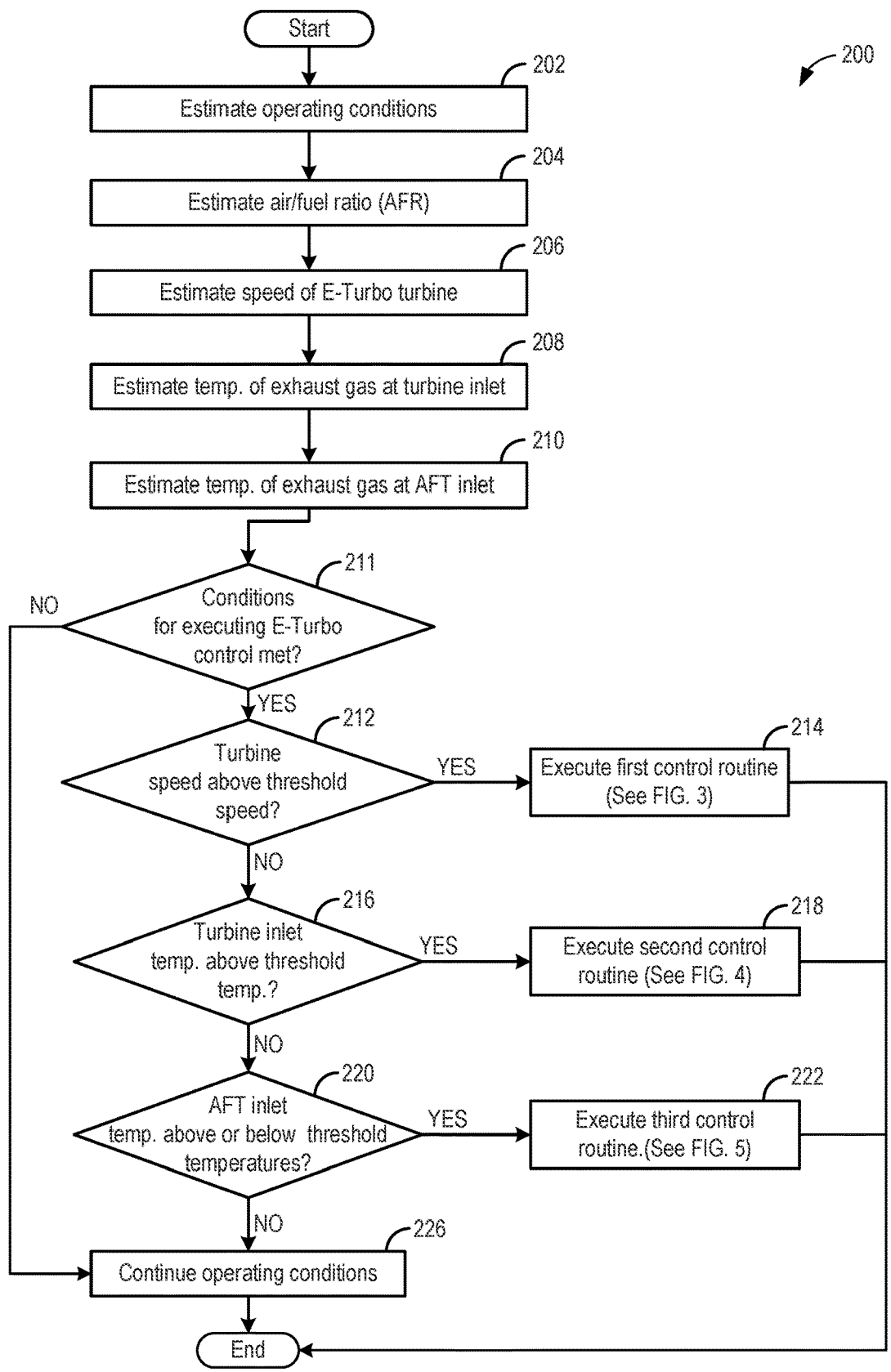
FIG. 2 is a flowchart describing a process for integrating control strategies for reducing an emissions of the vehicle system.

FIG. 1 illustrates an example of a vehicle system that includes an engine, an E-Turbo, an aftertreatment system, a fuel system and a control system. A controller of the vehicle system may use a plurality of different control strategies to adjust a speed of the engine or a speed of an exhaust turbine (referred to herein as the turbine) of the E-Turbo that are based at least in part on engine operating conditions. The plurality of different control strategies may be integrated to maximize an efficiency of the vehicle system, as shown by FIG. 2. The controller may use a first control strategy to adjust a speed of the engine or a speed of the turbine based on an air/fuel ratio (AFR) of the engine, such as the control strategy illustrated in FIG. 3. An exemplary timing of operations of the first control strategy is shown in FIG. 6A. The controller may use a second control strategy to adjust the speed of the engine or the speed of the turbine based on a temperature of exhaust gases generated by the engine upstream of the turbine, such as the control strategy illustrated in FIG. 4. An exemplary timing of operations of the second control strategy is shown in FIG. 6B. The controller may use a third control strategy to adjust the speed of the turbine based on the temperature of exhaust gases at an inlet of the aftertreatment system, such as the control strategy illustrated in FIG. 5. An exemplary timing of operations of the third control strategy is shown in FIG. 6C.

Referring to FIG. 1, a block diagram of an embodiment of a vehicle system 100 (e.g., an engine system) is shown, including a vehicle 106. In the illustrated embodiment, the vehicle is a rail vehicle (e.g., a locomotive) that may operate on a rail 102 via a plurality of wheels 112. In another embodiment, the vehicle system may be disposed in a vehicle such as an automobile or a truck. In still other embodiments, the vehicle system may include mining equipment, agricultural equipment, industrial equipment, or any other equipment that relies on tractive effort generated by a combination of one or more engines and one or more motors.

The vehicle system includes an engine 104. The engine includes a plurality of cylinders 101 (where one representative cylinder is shown in FIG. 1) that each include at least one intake valve 103, at least one exhaust valve 105, and at least one fuel injector 107. Each fuel injector may include an actuator that may be actuated via a signal from a controller 110 of the engine. The cylinders of the engine may receive fuel (e.g., diesel fuel) from a fuel system 103 via a fuel conduit 107. In some examples, the fuel conduit may be coupled with a common fuel rail and a plurality of fuel injectors.

During operation, each cylinder within the engine may use a four stroke cycle: the cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

The engine may receive intake air for combustion from an intake passage 114. The intake air includes ambient air from outside of the vehicle flowing into the intake passage through an air filter 160. The intake passage may include and/or be coupled to an intake manifold of the engine. Exhaust gas resulting from combustion in the engine is supplied to an exhaust passage 116. Exhaust gas flows through the exhaust passage, to a muffler 118, and out of an exhaust stack 119 of the vehicle.

In one example, the vehicle is a diesel-electric vehicle, where the engine may be coupled to an electric power generation system, including an alternator/generator 122 and electric traction motors 124. The alternator/generator may additionally include a direct current (DC) generator. In other examples, the engine may be a diesel engine, a gasoline engine, a biodiesel engine, an alcohol or hydrogen engine, a natural gas engine (spark or compression ignition), or a combination of two or more of the foregoing that generates a torque output during operation. The torque output may be transmitted to the electric generator or alternator through a mechanical coupling from the engine. As depicted herein, six pairs of traction motors correspond to each of six pairs of motive wheels of the vehicle. In another example, alternator/generator may be coupled to one or more resistive grids 126 or an energy storage device. The resistive grids may dissipate excess engine torque and/or electricity generated by traction motors in dynamic braking mode via heat produced by the grids from generated electricity. The energy storage device may be used to capture dynamic braking energy, or from the generator directly, or from any one of a number of selectively couplable sources of electricity (and conversely may pay out energy as may be useful).

Further, the alternator/generator produces electrical power that may be stored (such as, in a battery) and/or applied for subsequent propagation to a variety of downstream electrical components. In one example, the alternator/generator may be coupled to an electrical system, which may include one or more electrical loads configured to run on electricity generated by the alternator/generator, such as vehicle headlights, a cabin ventilation system, and an entertainment system, and may further include an energy storage device (e.g., a battery) configured to be charged by electricity generated by the alternator/generator.

The vehicle system may include a turbocharger 120 that may be arranged between the intake passage and the exhaust passage. The turbocharger increases air charge of ambient air drawn into the intake passage in order to provide greater charge density during combustion to increase power output and/or engine-operating efficiency. The turbocharger may include a compressor 121 (disposed in the intake passage) which may be at least partially driven by a turbine 123 (disposed in the exhaust passage). The turbine may be a fixed geometry turbine, or the turbine may be a variable geometry turbine, where a variable vane control adjusts a position of variable geometry turbine vanes. Exhaust gases may pass through the turbine supplying little energy to rotate the turbine when vanes are in an open position, while exhaust gases may pass through the turbine and impart increased force on the turbine when vanes are in a closed position. As the turbine rotates, heat and kinetic energy in the exhaust gases may be converted into mechanical energy, which may be used to drive the compressor of the turbocharger to deliver compressed air to the engine intake (e.g., to provide a pressure boost to cylinders of the engine based on engine operating conditions). While a single turbocharger is included in FIG. 1, the system may include multiple turbine and/or compressor stages. The turbine may include a turbine speed sensor 180, and a turbine inlet temperature sensor 125 may be positioned in the exhaust passage, upstream of an inlet of the turbine.

In another embodiment, the turbocharger may be an E-Turbo, where an electrical machine 190 mechanically coupled to the turbine may convert the mechanical energy into electrical energy. The E-turbo may be integrated into a shaft of the turbocharger, where the compressor and the turbine are mechanically linked. The E-Turbo may be operated as a motor/generator that can be used to motor the shaft (e.g., speed it up) to increase a work output of the compressor, or slow the shaft down to extract excess energy. While operating in a generating mode, extracting the excess exhaust energy may result in improved overall engine efficiency. While operating in a motoring mode, the compressor may provide additional airflow to the engine, which may improve a combustion and/or an emissions of the vehicle. Additionally, the electrical energy may be used to power one or more accessory devices of the vehicle, such as an electric motor, and/or stored in an energy storage device 196 (e.g., a battery, capacitor bank, or electro-chemical converter). In one example, the electric motor powers one or more wheels of the vehicle.

The vehicle system may also include a compressor bypass passage 140 coupled directly to the intake passage, upstream of the compressor and upstream of the engine. In one example, the compressor bypass passage may be coupled to the intake passage, upstream of the intake manifold of the engine. The compressor bypass passage may be configured to divert airflow (e.g., from before the compressor inlet) away from the engine (or intake manifold of the engine) and to atmosphere. A compressor bypass valve (CBV) 142 may be positioned in the compressor bypass passage and may include an actuator that may be controlled by the controller to adjust the amount of intake airflow diverted away from the engine and to atmosphere.

Additionally, a wastegate 127 may be disposed in a bypass passage around the turbine, which may be adjusted, via actuation from the controller, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

The vehicle system may further include a cooling system 150 (e.g., an engine cooling system). The cooling system may circulate coolant through the engine to absorb waste engine heat to distribute to a heat exchanger, such as a radiator 152 (e.g., a radiator heat exchanger). In one example, the coolant may be water, anti-freeze, or a mixture of the two. In another example, the coolant may be oil. A fan 154 may be further coupled to the radiator to maintain an airflow through the radiator when the vehicle is moving slowly or stopped while the engine is running. In some examples, a fan speed may be controlled by a controller 110. Coolant that is cooled by the radiator may enter a tank (not shown in FIG. 1). The coolant may then be pumped by a pump 156 back to the engine or to another component of the vehicle system.

The vehicle system may include an aftertreatment system 117 coupled in the exhaust passage downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems. In one example, an aftertreatment temperature sensor 115 is arranged at or upstream of an inlet of the aftertreatment system, which may measure a temperature of exhaust gas prior to entering the aftertreatment system. Additionally, one or more AFR sensors or oxygen ($O_2$) sensors may be arranged on an exhaust conduit upstream and/or downstream of the aftertreatment system. For example, an AFR sensor or $O_2$ sensor 181 may be arranged at the inlet of the aftertreatment system, which may estimate an AFR of the engine from the exhaust gas prior to entering the aftertreatment system, or an AFR sensor or $O_2$ sensor 182 may be arranged downstream of the aftertreatment system (e.g., at an exhaust pipe), which may estimate the AFR from exhaust gas exiting the aftertreatment system.

Catalysts are shown to exhibit a maximum (e.g., peak) NOx conversion at a particular exhaust gas temperature. As such, for minimizing vehicle emissions, it may be desirable to maintain temperatures within a range of temperatures near a peak conversion of the catalyst used in the exhaust gas aftertreatment system. For example, no oxidation or conversion may occur at low exhaust gas temperatures (e.g., below approximately 120° C.). As a temperature of a catalyst in the aftertreatment system increases, the oxidation or conversion rates may increase. As the catalyst temperature is raised above a threshold temperature (e.g., 150° C.), the conversion rates may increase steeply with increasing temperature to maximum conversions rates (e.g., 90% for carbon monoxide (CO) and 70% for hydrocarbon (HC)). At high temperatures (e.g., 250° C.-350° C.), the catalyst performance stabilizes to form a characteristic plateau on the light-off curve. As such, it may be desirable, for minimizing vehicle emissions, to maintain exhaust gas temperatures above the plateau temperature, within a range in which typical exhaust gas aftertreatment systems exhibit near maximum conversion efficiency.

A temperature of exhaust gases entering the aftertreatment system may be controlled by the controller to ensure that an efficiency of the aftertreatment is maximized. As an example, NOx reduction may be primarily achieved via control of airflow. However, such a change in air flow may increase an amount of boost required from the turbocharger. Thus, the turbocharger may be operated to decrease vehicle emissions. In one example, the aftertreatment temperature sensor further comprises composition sensors. Suitable sensors may include hydrocarbon, NOx, or carbon monoxide sensors. Depending on the signals from the aftertreatment temperature sensor, the controller may execute various instructions to raise, lower, or maintain the exhaust gas temperature.

In an embodiment, the E-turbo may be controlled in a generator mode to control the temperature of the exhaust gases. For example, during a first condition that includes the exhaust gas temperature being below a threshold temperature, the controller may increase the temperature of the exhaust gases flowing through the aftertreatment system by increasing an amount of energy extracted by the E-turbo. A portion of the extracted energy may be used to power the alternator, or to power the wheels, while a remaining portion of the extracted energy used to power the compressor of the turbocharger may decrease. As a result of the decreased power supplied to the compressor, an overall airflow to the engine may decrease, resulting in a higher engine exhaust temperature and an increase in the temperature of the exhaust gases flowing through the aftertreatment system.

Alternatively, during a second condition that includes the exhaust gas temperature being greater than the threshold temperature, the controller may decrease the temperature of the exhaust gas flowing through the aftertreatment system by decreasing the amount of energy extracted by the E-turbo. As less energy is extracted by the E-turbo, the portion of the extracted energy used to power the compressor may increase. As a result of the increased power supplied to the compressor, the airflow to the engine may increase, resulting in a lower engine exhaust temperature and a decrease in the temperature of the exhaust gases flowing through the aftertreatment system. In this way, the controller may control the temperature of the exhaust gases in the aftertreatment system by controlling the amount of energy extracted by the E-turbo, responsive to the temperature of the exhaust gas measured via the aftertreatment temperature sensor.

In one example, the E-turbo always operates in the generator mode, where energy is extracted from the exhaust gases at each and every operating setpoint of the engine, and the amount of energy extracted is adjusted to increase or decrease the temperature of the exhaust gases. In another example, the E-turbo may operate in the generator mode, and also in a motor mode. In the motor mode, energy may not be extracted by the E-turbo, but rather added by the E-turbo to increase a speed of the turbine, thereby increasing the power supplied to the compressor and increasing airflow to the engine. As result of the increased airflow to the engine, the temperature of the exhaust gases may decrease.

In yet another example, the wastegate may be adjusted to increase or decrease the flow of exhaust gases through the turbine. As the flow of exhaust gases through the turbine is increased, a temperature of the exhaust gases may be reduced. Alternatively, as the flow of exhaust gases through the turbine is decreased, the temperature of the exhaust gases may increase. Thus, by opening or closing the wastegate, thereby decreasing or increasing, respectively, the exhaust flow through the turbine, the temperature of the exhaust gases entering the aftertreatment system may be at least partially controlled to maintain the exhaust gases within a temperature range at which an efficiency of the aftertreatment system is maximized.

The vehicle system may include an exhaust gas recirculation (EGR) system 185 coupled to the engine. The EGR system may route exhaust gas from the exhaust passage of the engine to the intake passage downstream of the turbocharger. In some embodiments, the exhaust gas recirculation system may be coupled exclusively to a group of one or more donor cylinders of the engine (also referred to as a donor cylinder system).

The controller may control various components and operations related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation. In some examples, the controller may include more than one controller each in communication with one another, such as a first controller to control the engine and a second controller to control other operating parameters of the vehicle (such as engine load, engine speed, brake torque, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the vehicle, may receive signals from a variety of engine sensors. The signals may be used to determine operating parameters and operating conditions, and correspondingly adjust various engine actuators to control operation of the vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the turbine inlet temperature sensor 125, or the exhaust temperature entering the aftertreatment system, as determined from the inlet temperature sensor 115), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the vehicle by sending commands to various components such as the traction motors, the alternator/generator, cylinder valves, fuel injectors, a notch throttle, the compressor bypass valve (or an engine bypass valve in alternate embodiments), the wastegate, or the like. Other actively operating and controlling actuators may be coupled to various locations in the vehicle.

Further, the controller may monitor an engine throttle setting. This may be performed for an engine governor. For example, the engine governor may react to the engine throttle setting in order to adjust engine operation. In one embodiment, the throttle setting may be infinitely adjustable. In one embodiment, an operator of the vehicle may adjust an input device between a plurality of determined engine notch settings. Based on the selected engine notch setting, the controller may adjust engine operation to provide the desired engine performance (e.g., such as a desired vehicle speed). As an example, the plurality of engine notch settings may include a notch 0, a notch 1, a notch 2, a notch 3, a notch 4, a notch 5, a notch 6, a notch 7, and a notch 8. An increase in the numerical value of the notch may correspond (directly or indirectly) with an increase in vehicle speed and/or with engine power output. It may further make adjustments to fuel injection timing and fuel rail pressure. For example, notch 0 may correspond to not moving the locomotive, notch 4 may provide a mid-level of speed, and notch 8 may be the maximum speed setting. For example, the controller may adjust engine revolutions per minute (RPM), gearing, valve timings, and other parameters in order to move the vehicle at a speed corresponding to the selected engine notch. For example, the engine may be adjusted to generate more power in order to increase the vehicle speed, or to accommodate a heavy load (e.g., due to cargo and/or grade) at a lower vehicle speed.

Turning now to FIG. 2, a flowchart is shown of a method 200 for controlling an E-Turbo (e.g., the turbocharger 120 of vehicle system 100 of FIG. 1) of the vehicle, wherein an electric machine is mechanically coupled to an exhaust turbine of the E-Turbo. In one example, a strategy for controlling the E-Turbo includes maintaining a temperature of the exhaust gases within a desired temperature range, the desired temperature range a temperature range at which an efficiency of an aftertreatment system (e.g., the aftertreatment system of the vehicle system of FIG. 1) is controlled (e.g., maximized). When the efficiency of the aftertreatment system is maximized, a level of emissions of the vehicle may be minimized. In other examples, the control strategy may include maximizing an efficiency of the engine by maintaining a boost pressure generated by a compressor (e.g., the compressor of the vehicle system of FIG. 1) of the E-Turbo at a target boost pressure; meeting a demand for power delivered by the electric machine; maximizing an amount of power recovered from a combustion of fuel during fuel injection, where an amount of heat generated by the fuel injection exceeds a demand for heat; minimizing a rate of degeneration of one or more components of an exhaust system of the vehicle; or maximizing an overall efficiency of a plurality of components of an engine system of the vehicle. The method 200 may be executed by a processor of a controller of the vehicle, such as the controller of the vehicle of FIG. 1, based on instructions stored in a memory of the controller.

The method 200 begins at step 202 which includes estimating and/or measuring vehicle operating conditions. Vehicle operating conditions may be estimated based on one or more outputs of various sensors of the vehicle (e.g., such as one or more exhaust temperature sensors, an engine, wheel, and/or turbocharger turbine velocity sensor, torque sensor, pressure sensor, etc., as described above in reference to the vehicle system of FIG. 1). Vehicle operating conditions may include engine velocity and load, vehicle velocity, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor velocity, battery charge, engine torque output, vehicle wheel torque, and the like.

At step 204, the method includes estimating an AFR of the engine. In one example, the AFR is estimated by an AFR sensor or one or more oxygen ($O_2$) sensors arranged in an exhaust system of the vehicle. For example, an AFR sensor or $O_2$ sensor may be positioned downstream of the aftertreatment system (e.g., the AFR sensor or $O_2$ sensor 182 of vehicle system 100 of FIG. 1), or an $O_2$ sensor may be positioned upstream of the aftertreatment system (e.g., the AFR sensor or $O_2$ sensor 181 of vehicle system 100 of FIG. 1), between an outlet of the turbine and an inlet of the aftertreatment system, or an AFR sensor or $O_2$ sensor may be positioned both upstream and downstream of the aftertreatment system, and/or at one or more different locations in the exhaust system.

At step 206, the method includes estimating a speed of the exhaust turbine. As the engine combusts fuel, exhaust gases exiting an exhaust manifold of the engine may be flowed through the turbine, causing the turbine to rotate. The rotation of the turbine may generate power to operate a compressor of the E-turbo, which may deliver compressed air to an intake manifold of the engine to provide a boost pressure at a plurality of cylinders of the engine. The boost generated by the E-turbo may increase a power and/or efficiency of the engine. Additionally, the speed of the turbine may be increased or decreased (e.g., by the controller). For example, the electric machine coupled to the E-turbo may be operated to extract power from the E-turbo, thereby slowing the turbine down (e.g., responsive to a first condition), or the generator may be operated to input power into the turbocharger by increasing the speed of the turbine (e.g., responsive to a second condition). In one example the speed of the turbine is estimated by a turbine speed sensor, such as the turbine speed sensor 180 of vehicle system 100 of FIG. 1.

At step 208, the method includes estimating a turbine exhaust gas temperature of the exhaust gases at an inlet of the turbine. The turbine exhaust gas temperature may be estimated via a turbine inlet temperature sensor (e.g., the turbine inlet temperature sensor 125 of vehicle system 100 of FIG. 1). At step 210, the method includes estimating an aftertreatment exhaust gas temperature of the exhaust gases at an inlet of the aftertreatment system. The aftertreatment exhaust gas temperature may be estimated via an aftertreatment temperature sensor (e.g., the aftertreatment temperature sensor 115 of vehicle system 100 of FIG. 1).

At step 211, the method includes determining whether conditions for executing an E-Turbo control routine are met. In one embodiment, the conditions for executing the E-Turbo control routine may include a temperature of the engine being above a threshold temperature (e.g., 250° C.) and the engine operating at a steady state. For example, after a cold start of the engine, the conditions for executing an E-Turbo exhaust temperature control routine may not be met. Once the vehicle has been operating long enough for the engine to have warmed up above the threshold temperature, the conditions for executing the E-Turbo exhaust temperature control routine may be met. The conditions for executing the E-Turbo control routine may include a speed of the exhaust turbine exceeding a threshold turbine speed. For example, maximizing a remaining useful life of the turbine may depend on maintaining the turbine speed below the threshold turbine speed. The remaining useful life of the turbine may also depend on a temperature of the turbine not exceeding a temperature threshold, whereby the conditions for executing the E-Turbo exhaust temperature control routine may also include a temperature of the exhaust gases exceeding a threshold exhaust gas temperature at an inlet of the turbine.

The conditions for executing the E-Turbo control routine may include an AFR of the engine not being within a desired AFR range. Under optimal engine operating conditions, the AFR may be lean, at, or close to stoichiometry. For example, with some engines (e.g., that use gasoline), under normal operating conditions the ideal AFR may at or above stoichiometry (e.g., 14.7), where all fuel in the air/fuel mixture is combusted. For other engines (e.g., diesel engines), under normal operating conditions the AFR may be leaner (e.g., 30) During operation the AFR may vary, where under some engine operating conditions, the AFR may decrease (e.g., a percentage of air in an air/fuel mixture of the engine may decrease), while under other engine operating conditions the AFR may increase (e.g., a percentage of air in an air/fuel mixture of the engine may increase). As the AFR decreases, an air flow of the exhaust gases through the E-Turbo may increase, and when the AFR increases, the air flow of the exhaust gases through the E-Turbo may decrease. Additionally, the percentage of fuel in the air/fuel mixture may be correlated with a percentage of uncombusted fuel in the exhaust gases. A level of emissions of the vehicle may depend on the percentage of uncombusted fuel in the exhaust gases, where if the percentage of uncombusted fuel in the exhaust gases is low, the level of emissions may be lower, and if the percentage of uncombusted fuel in the exhaust gases is high, the level of emissions may be higher.

The conditions for executing the E-Turbo exhaust temperature control routine may include the temperature of the exhaust gases not being within a temperature range where an efficiency of one or more aftertreatment devices of the aftertreatment system is maximized. For example, the temperature of the exhaust gas may decrease below a lower limit of a desired temperature range of the one or more aftertreatment devices, where the desired temperature range is a range of temperatures at which an efficiency of the one or more aftertreatment devices is maximized. As a result of the temperature of the exhaust gas decreasing below the lower limit of the desired temperature range, the efficiency of the one or more aftertreatment devices may decrease, and a level of emissions released into the atmosphere via the exhaust gas may increase. By executing the E-Turbo exhaust temperature control routine, the level of emissions released into the atmosphere via the exhaust gas may be reduced or maintained.

If at step 211 it is determined that the conditions for executing the E-Turbo control routine are not met, the method proceeds to 226. At 226, the method includes continuing operating conditions, and the method ends. If at step 211 it is determined that the conditions for executing the E-Turbo control routine are met, the method proceeds to 212.

At step 212, the method includes determining whether the speed of the turbine is greater than a threshold turbine speed, where the threshold turbine speed is an upper bound of a desired turbine speed range. For example, the desired turbine speed range may be a range within which an efficiency of the engine is maximized, or a range within which an efficiency of the aftertreatment system is maximized, or a range within which a remaining useful life of the turbine is maximized In one example, the desired threshold turbine speed is 24,000 rpm.

If at step 212 it is determined that the speed of the turbine is greater than the first threshold turbine speed, the method proceeds to step 214. At step 214, the method includes executing a first control routine. The first control routine is described below in reference to FIG. 3. Alternatively, if at step 212 it is determined that the speed of the turbine is not greater than the first threshold turbine speed, the method proceeds to step 216.

At step 216, the method includes determining whether the turbine exhaust gas temperature (e.g., the temperature of the exhaust gases at the inlet of the turbine) is greater than a threshold turbine exhaust gas temperature. If at step 216 it is determined that the turbine exhaust gas temperature is greater than the threshold turbine exhaust gas temperature, the method proceeds to step 218. At step 218, the method includes executing a second control routine. The second control routine is described below in reference to FIG. 4. Alternatively, if at step 216 it is determined that the turbine exhaust gas temperature is not greater than the threshold turbine exhaust gas temperature, the method proceeds to step 220.

At step 220, the method includes determining whether the aftertreatment exhaust gas temperature (e.g., the temperature of the exhaust gases at the inlet of the aftertreatment system) is greater than a first threshold aftertreatment exhaust gas temperature or less than a second threshold aftertreatment exhaust gas temperature, where the first threshold aftertreatment exhaust gas temperature and the second threshold threshold aftertreatment exhaust gas temperature are upper and lower bounds of a desired aftertreatment exhaust gas temperature range. In one example, the desired threshold aftertreatment exhaust gas temperature range may be a range within which an efficiency of the aftertreatment system is maximized. In one example, the desired threshold aftertreatment exhaust gas temperature range is 250-500° C.

If at step 220 it is determined that the aftertreatment exhaust gas temperature is greater than the first threshold aftertreatment exhaust gas temperature or less than the second threshold aftertreatment exhaust gas temperature, the method proceeds to step 222. At step 222, the method includes executing a third control routine. The third control routine is described below in reference to FIG. 5. Alternatively, if at step 222 it is determined that the aftertreatment exhaust gas temperature is not greater than the first threshold aftertreatment exhaust gas temperature or less than the second threshold aftertreatment exhaust gas temperature, the method proceeds to step 226. At step 226, the method includes continuing the operating conditions of the vehicle, and the method ends.

Figure 3:
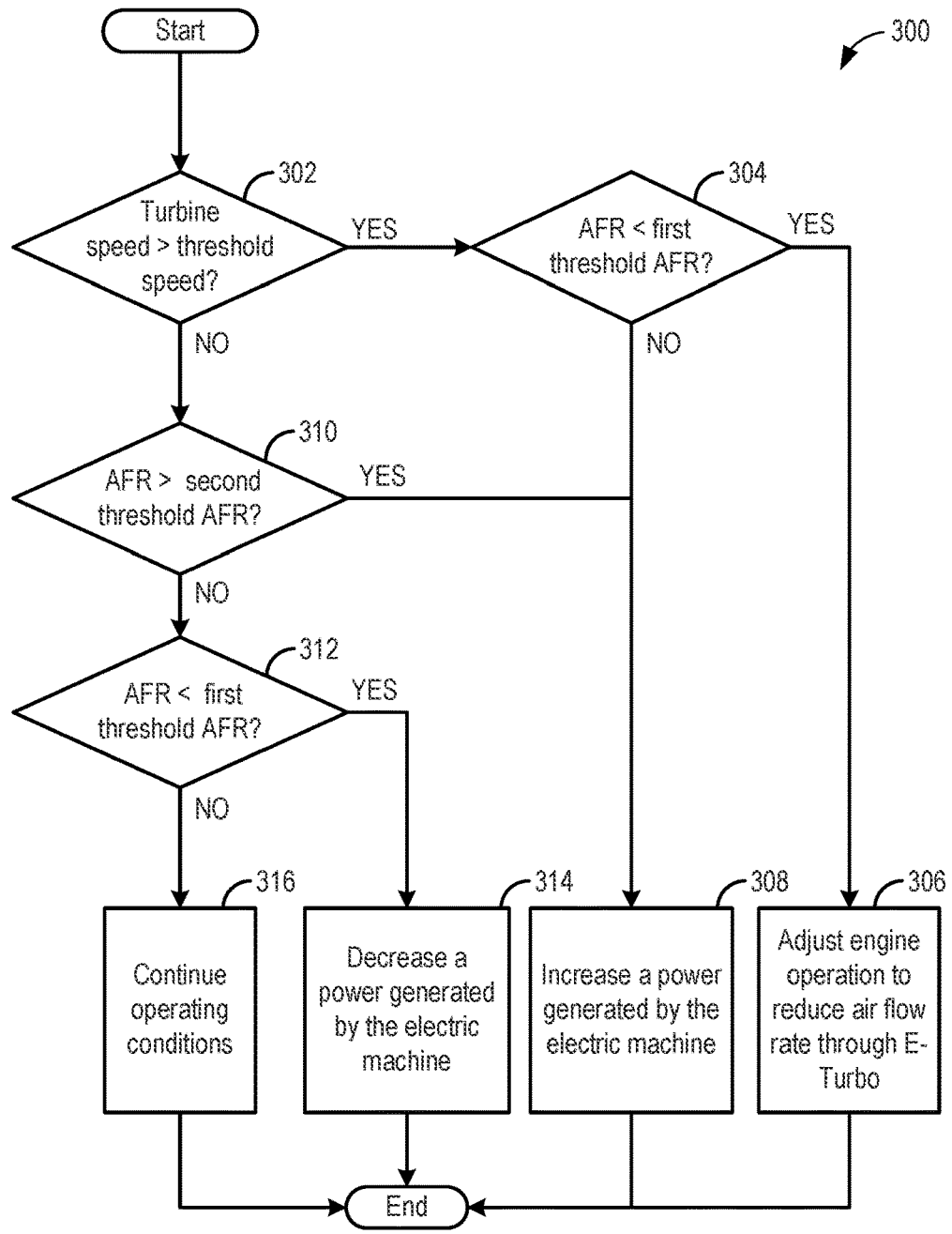
FIG. 3 is a flowchart illustrating an example method for controlling a turbine of an E-Turbo in a first condition.

Turning now to FIG. 3, a flowchart is shown of a method 300 for controlling an E-Turbo (e.g., the turbocharger of vehicle system of FIG. 1) of a vehicle via an electric machine of the E-Turbo. In one embodiment, the electric machine functions as a generator that converts the mechanical energy of the turbine into electrical energy used to power a compressor of the E-Turbo (e.g., the compressor of vehicle system of FIG. 1. In one example, the method is executed as part of a control strategy to maintain a speed of a turbine of the E-Turbo within a desired turbine speed range to maximize a remaining useful life of the exhaust turbine. In another example, the method is executed as part of a control strategy to maintain an AFR of the engine within a desired AFR range to maximize a performance of an engine of the vehicle. In yet another example, the method is executed as part of a control strategy to maintain a temperature of exhaust gases of the engine within a desired temperature range to minimize an amount of emissions of the vehicle. The method may be executed by a processor of a controller of the vehicle. Suitable controllers may include the controller of the vehicle of FIG. 1, based on instructions stored in a memory of the controller. In one example, the method may be executed as part of another method, such as the one described above in reference to FIG. 2.

The method begins at step 302, where the method includes determining whether the speed of the turbine is greater than a threshold turbine speed (e.g., 24,000 RPM). If at step 302 it is determined that the speed of the turbine is greater than the threshold turbine speed, the method proceeds to step 304.

At step 304, the method includes determining whether an AFR of the engine is less than a first threshold AFR (e.g., 26). In one example, the AFR is estimated by an AFR sensor or an $O_2$ sensor arranged upstream or downstream of an aftertreatment system of the vehicle, such as the AFR sensor or $O_2$ sensors of the vehicle system of FIG. 1.

If at step 304 it is determined that the AFR is less than a first threshold AFR, the method proceeds to step 306. At step 306, the method includes adjusting an operation of the engine to reduce a flow rate of air through the E-Turbo, thereby reducing the turbine speed. In one example, adjusting the operation of the engine includes derating the engine (e.g., decreasing a speed and/or power of the engine). In another example, adjusting the operation of the engine includes advancing a timing of combustion at one or more cylinders of the engine. By reducing the air flow rate through the E-Turbo, the turbine speed may be reduced. In other examples, other operational parameters of the engine may be adjusted to reduce the flow rate of air through the E-Turbo.

Alternatively, if at step 304 it is determined that the AFR is not less than the first threshold AFR, the method proceeds to step 308. At step 308, the method includes increasing a power generated by the electric machine (e.g., increasing an amount of energy extracted by the electric machine). As a result of increasing the power generated by the electric machine, the turbine speed may decrease.

In one example, the turbine may be sized such that energy is extracted by the electric machine at each and every operating setpoint of the engine. In an example where the vehicle is a locomotive, the engine may have determined operating points that are operationally optimized. These operating points (at least in traditional railroading applications) may be nine setpoints corresponding to nine notch settings—from notch 0 to notch 8. The turbine may be sized for maximizing efficiency at higher notches (e.g., notch 7 and/or 8), whereby the turbine may operate less efficiently at lower notches (e.g., notch 1 and/or 2). As a result of the turbine being sized for maximizing efficiency at higher notches, the flow of exhaust gases through the turbine may rotate the turbine to generate a mechanical energy at each and every notch setting from notch 0 to notch 8. In other words, the electric machine functions in a generator mode but not in a motor mode, converting the mechanical energy generated at each setpoint (e.g., notch setting) into electrical energy.

In examples where the engine is infinitely variable across its operating range, as may be found in applications where the engine (and thus the engine speed) is mechanically coupled to the wheels (and thus the vehicle speed) the turbine may be operated according to embodiments set out herein.

The increased energy (or a portion of the increased energy) extracted by the electric machine may be used by a motor of the vehicle to power one or more wheels of the vehicle. In another example, the increased energy (or a portion of the increased energy) extracted by the electric machine may be stored in an energy storage device (e.g., a battery), or used to power one or more electrical devices of the vehicle (e.g., radio, lights, power steering, etc.).

Returning to step 302, if at step 302 it is determined that the speed of the turbine is not greater than the threshold turbine speed, the method proceeds to step 310. At step 310, the method includes determining whether the AFR is greater than a second threshold AFR. If at step 310 it is determined that the AFR is greater than the second threshold AFR, the method proceeds to step 308, where the method includes increasing a power generated by the electric machine (e.g., thereby decreasing the turbine speed).

Alternatively, if at step 310 it is determined that the AFR is not greater than the first threshold AFR, the method proceeds to step 312. At step 312, the method includes determining whether the AFR is less than the first threshold AFR. If at step 312 it is determined that the AFR is less than the first threshold AFR, the method proceeds to step 314. At step 314, the method includes decreasing the power generated by the electric machine, thereby increasing the speed of the turbine. In one example, the controller decreases the power generated by the electric machine to increase the speed of the turbine by adjusting a number or type of electrical loads coupled to the electric machine. For example, an alternator load may be increased, or a compressor load may be increased, or load of an accessory device of the vehicle may be increased.

Alternatively, if at step 312 it is determined that the AFR is not less than the first threshold, it may be inferred that the AFR is within the desired AFR range, and the method proceeds to step 322. At step 322, the method includes continuing the operating conditions of the vehicle, and the method ends.

Thus, twin goals of maintaining a desired AFR for engine performance while ensuring that the turbine speed does not exceed a maximum speed may be achieved by the method. If the turbine speed is above a desired speed whereby a remaining useful life of the turbine may be reduced, the method reduces the turbine speed by either operating the electric machine to slow down the turbine (if the AFR is at or above a desired ratio), or derating the engine (if the AFR is lower than a desired ratio). Alternatively, if the turbine speed is within an acceptable range, then the method optimizes the performance of the engine by either operating the electric machine to slow down the turbine (if the AFR is high) or operating the electric machine to speed up the turbine (if the AFR is low). Further, the electric machine may be operated to speed up or slow down the turbine to control a temperature of the exhaust gases, as described below in reference to FIG. 4.

Figure 4:
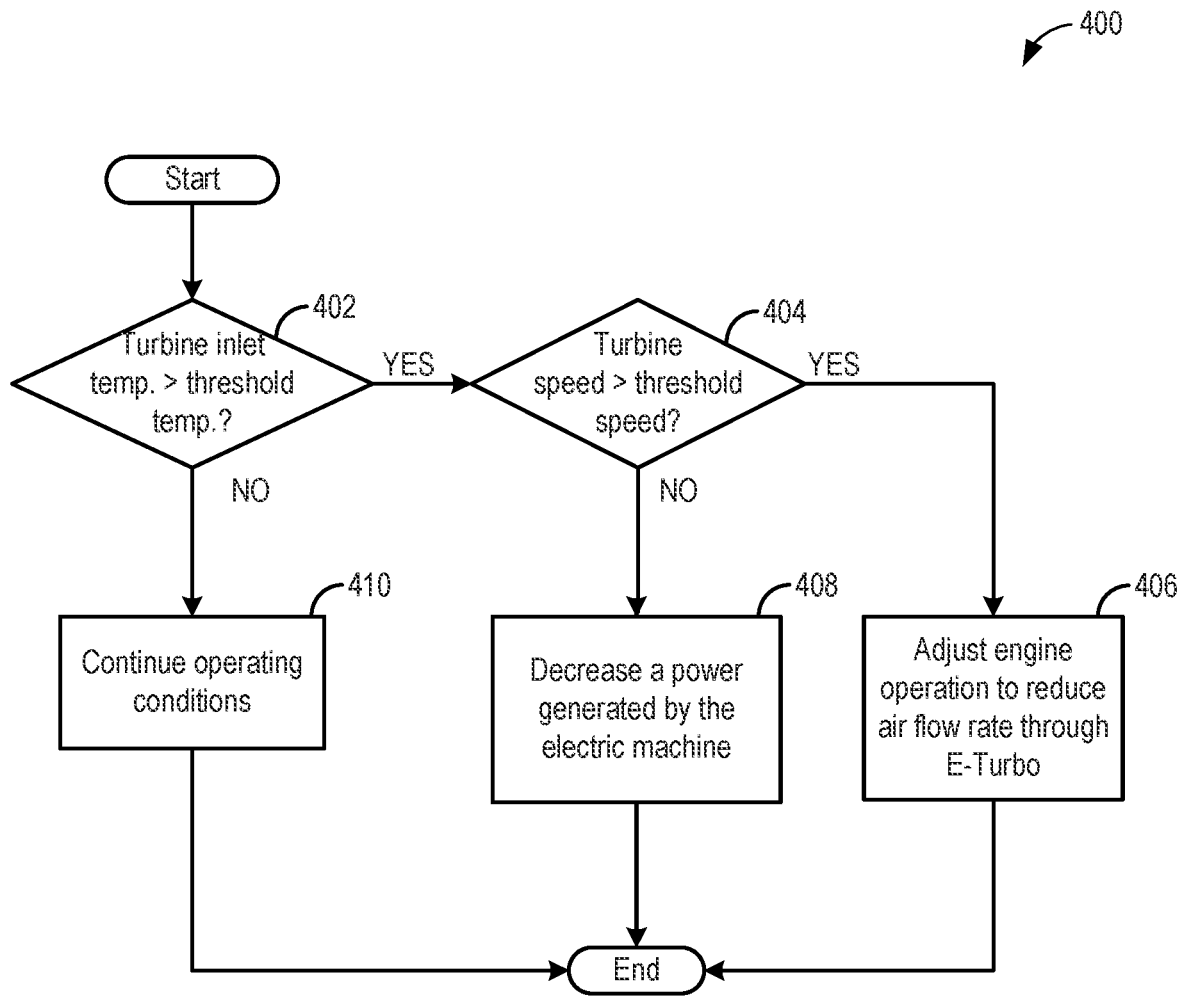
FIG. 4 is a flowchart illustrating an example method for controlling a turbine of an E-Turbo in a second condition.

Turning now to FIG. 4, a flowchart is shown of a method 400 for controlling an E-Turbo (e.g., the turbocharger 120 of vehicle system 100 of FIG. 1) of a vehicle via an electric machine of the E-Turbo. In one example, the method may be executed as part of a control strategy to maintain a temperature of exhaust gases entering an exhaust turbine of the E-Turbo within a desired exhaust gas temperature range, for example, to maximize a remaining useful life of the exhaust turbine. In another example, the method is executed as part of a control strategy to maintain a temperature of exhaust gases of the engine within a desired temperature range to minimize an amount of emissions of the vehicle. Controlling the E-Turbo to maintain the temperature of the exhaust gases entering the exhaust turbine of the E-Turbo within the desired exhaust gas temperature range may include controlling a power generated by an electric machine of the E-Turbo (e.g., the turbocharger of vehicle system of FIG. 1) via an exhaust turbine of the E-Turbo. Power may be generated by the electric machine as exhaust gases pass through the exhaust turbine, where a flow of the exhaust gases causes the turbine to rotate. As the turbine rotates, an amount of energy is extracted from exhaust gases passing through a plurality of vanes of the exhaust turbine. The energy extracted from the exhaust gases may be in the form of heat energy and/or kinetic energy, which may be converted into mechanical (e.g., rotational) energy by the turbine.

In one embodiment, the electric machine functions as a generator that converts the mechanical energy of the turbine into electrical energy. In a generator mode, the electric machine may convert the mechanical energy of the turbine into electrical energy (e.g., extracting energy from and decreasing a speed of the exhaust turbine), or in a motor mode, the electric machine may add energy to the compressor (e.g., by increasing the speed of the exhaust turbine). By decreasing the speed of the exhaust turbine, a speed of the compressor may decrease, generating less airflow to the engine and increasing the temperature of the exhaust gases. By increasing the speed of the exhaust turbine, a speed of the compressor may increase, generating more airflow to the engine and decreasing the temperature of the exhaust gases. The method may be executed by a processor of a controller of the vehicle based on instructions stored in a memory of the controller. In one example, the method may be executed as part of the method described above in reference to FIG. 2.

The method begins at step 402, where the method includes determining whether the temperature of the exhaust gases at an inlet of the turbine is greater than a threshold exhaust gas temperature (e.g., 250° C.). If, at step 402, it is determined that the temperature of the exhaust gases is greater than the threshold exhaust gas temperature, the method proceeds to step 404.

At step 404, the method includes determining whether a speed of the turbine is greater than a threshold turbine speed (e.g., 24,000 RPM). If at step 404 it is determined that the speed of the turbine is greater than the threshold turbine speed, the method proceeds to step 406. At step 406, the method includes adjusting an operation of the engine to reduce a flow rate of air through the E-Turbo, thereby reducing the turbine speed. In one example, adjusting the operation of the engine includes derating the engine (e.g., decreasing a speed and/or power of the engine). In another example, adjusting the operation of the engine includes advancing a timing of combustion at one or more cylinders of the engine. By reducing the air flow rate through the E-Turbo, the turbine speed may be reduced. In other examples, other operational parameters of the engine may be adjusted to reduce the flow rate of air through the E-Turbo.

Alternatively, if at step 404 it is determined that it is determined that the speed of the turbine is not greater than the threshold turbine speed, the method proceeds to step 408. At step 408, the method includes decreasing a power generated by the electric machine. As a result of decreasing the power generated by the electric machine, the turbine speed may increase. In one example, the controller decreases the power generated by the electric machine to decrease the speed of the turbine by adjusting a number or type of electrical loads coupled to the electric machine.

In some embodiments, if the turbine inlet temperature is greater than the threshold exhaust gas temperature the temperature of the exhaust gases may also be controlled via an EGR system of the vehicle (e.g., the EGR system 185 of FIG. 1). The EGR may be used to control airflow to the engine. If the airflow via the EGR is increased (e.g., while the AFR remains constant), the exhaust gas temperature will decrease, and if the airflow via the EGR is decreased, the exhaust gas temperature will increase.

Returning to step 402, if at step 402 it is determined that the temperature of the exhaust gases is not greater than the threshold exhaust gas temperature, the method proceeds to step 410. At step 410, the method includes continuing the operating conditions of the vehicle, and the method ends.

Figure 5:
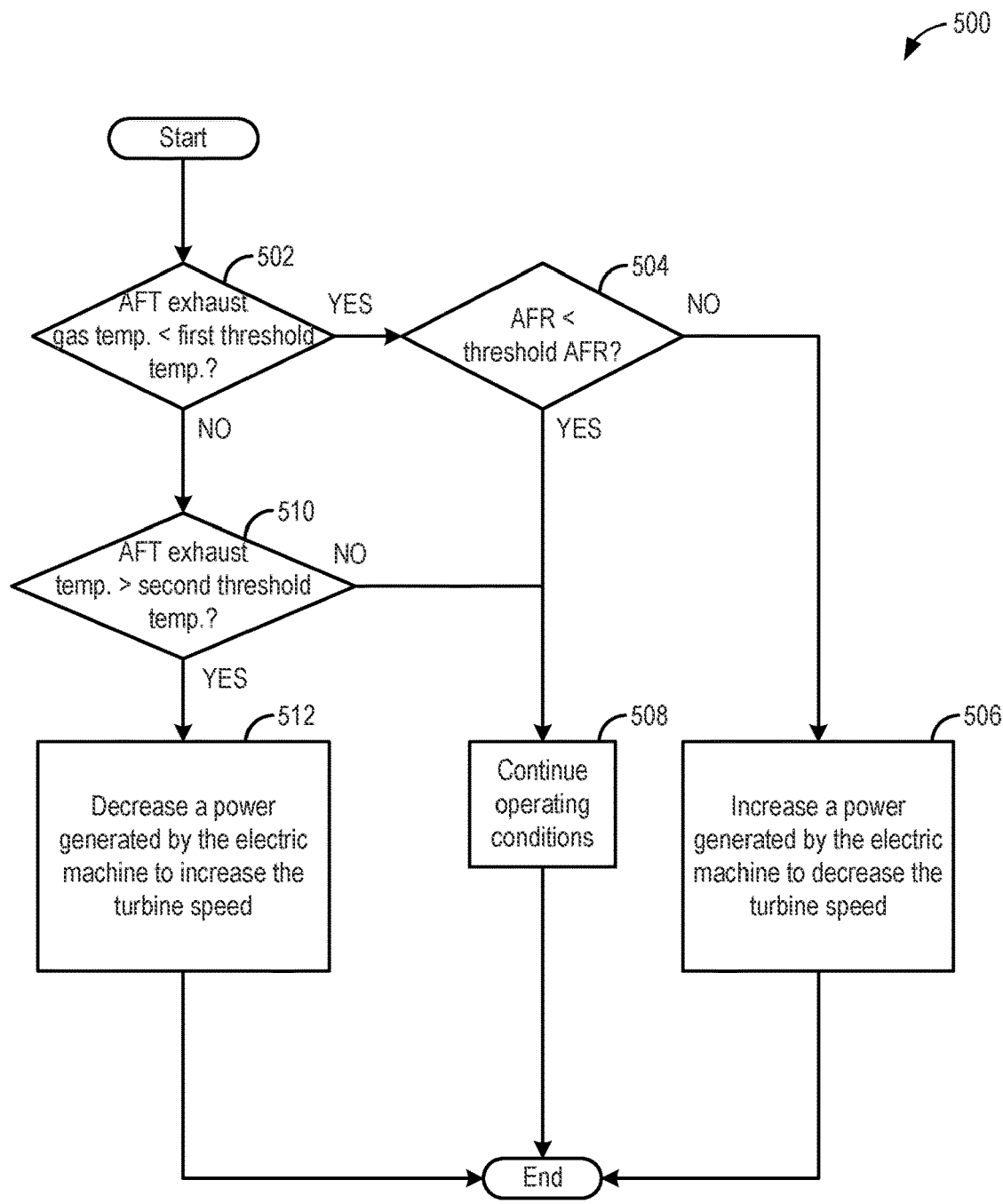
FIG. 5 is a flowchart of an example method for controlling a turbine of an E-Turbo in a third condition.

Turning now to FIG. 5, a flowchart is shown of a method 500 for controlling an E-Turbo (e.g., the turbocharger of vehicle system of FIG. 1) of a vehicle via an electric machine of the E-Turbo. In one example, method 500 is executed as part of a control strategy to maintain a temperature of the exhaust gases within a desired temperature range, the desired temperature range a temperature range at which an efficiency of an aftertreatment system (e.g., the aftertreatment system of vehicle system of FIG. 1) is maximized. For example, the efficiency of an aftertreatment system may be maximized when an amount of emissions of the vehicle is minimized. Controlling the E-Turbo to maintain the temperature of the exhaust gases entering the aftertreatment system within the desired temperature range may include controlling a power generated by an electric machine of the E-Turbo (e.g., the turbocharger of vehicle system of FIG. 1) via an exhaust turbine of the E-Turbo. Method 500 may be executed by a processor of a controller of the vehicle, such as the controller of the vehicle system of FIG. 1, based on instructions stored in a memory of the controller. In one example, method 500 may be executed as part of the method described above in reference to FIG. 2.

Method 500 begins at step 502, where the method includes determining whether the temperature of the exhaust gases at an inlet of the aftertreatment system is less than a first threshold aftertreatment exhaust gas temperature (e.g., 250° C.). If at step 502 it is determined that the temperature of the exhaust gases is less than the first threshold aftertreatment exhaust gas temperature, the method proceeds to step 504.

At step 504, the method includes determining whether an AFR of the engine is less than a first threshold AFR (e.g., 30). In one example, the AFR is estimated by an AFR sensor or an $O_2$ sensor arranged upstream or downstream of an aftertreatment system of the vehicle, such as the AFR sensor or $O_2$ sensors of the vehicle system of FIG. 1. As described above in reference to FIG. 3, the percentage of fuel in the air/fuel mixture may be correlated with a percentage of uncombusted fuel in the exhaust gases. A level of emissions of the vehicle may depend on the percentage of uncombusted fuel in the exhaust gases, where if the percentage of uncombusted fuel in the exhaust gases is low, the level of emissions may be lower, and if the percentage of uncombusted fuel in the exhaust gases is high, the level of emissions may be higher. Thus, the level of emissions may be reduced by maintaining the AFR within a desired AFR range.

If at step 504 it is determined that the AFR is less than the first threshold AFR, the method proceeds to step 508. At step 508, the method includes continuing operating conditions. If at step 504 it is determined that the AFR is not less than the first threshold AFR, the method proceeds to step 506. At step 506, the method includes increasing a power generated by the electric machine (e.g., increasing an amount of energy extracted from the turbocharger by the electric machine). As a result of increasing the power generated by the electric machine, the turbine speed may decrease. As described above, operating the electric machine to extract energy from the E-turbo may decrease the speed of the turbine. By decreasing the speed of the turbine, an amount of energy supplied to a compressor of the E-turbo may decrease, whereby an airflow to the engine may be decreased. By decreasing the airflow to the engine, the temperature of the exhaust gases (e.g., at the inlet of the aftertreatment system) may decrease.

Returning to step 502, if at step 502 it is determined that the temperature of the exhaust gases is not less than the threshold aftertreatment exhaust gas temperature, the method proceeds to step 510. At step 510, the method includes determining whether the temperature of the exhaust gases at an inlet of the aftertreatment system is greater than a second threshold aftertreatment exhaust gas temperature (e.g., 500° C.). If at step 510 it is determined that the temperature of the exhaust gases is greater than the second threshold aftertreatment exhaust gas temperature, the method proceeds to step 512.

At step 512, the method includes decreasing a power generated (e.g., extracted) by the electric machine. As a result of decreasing the power generated by the electric machine, the turbine speed may increase. By increasing the speed of the turbine, a greater amount of energy may be supplied to the compressor, whereby the airflow to the engine may be increased. By increasing the airflow to the engine, the temperature of the exhaust gases may decrease.

Example implementations of the flowcharts of FIGS. 3-5 are illustrated in FIGS. 6A-6D, 7A-7B, and 8A-8B, which show example timing diagrams illustrating a timing of operations performed to control an E-Turbo of a vehicle, such as the E-Turbo of the vehicle system of FIG. 1. The operations may be performed to regulate one or more parameters of an exhaust system of the vehicle. For example, a temperature of exhaust gas generated by an engine of the vehicle may be controlled, as measured at an inlet of an exhaust gas aftertreatment device (also referred to herein as the aftertreatment device) of the vehicle (e.g., a device of the aftertreatment system of the vehicle system of FIG. 1). As described above in relation to FIG. 2, the temperature of the exhaust gas may be maintained within a desired temperature range of the aftertreatment device, where the desired temperature range is a range of temperatures at which an efficiency of the aftertreatment device is maximized. A speed of an exhaust turbine (e.g., the exhaust turbine of the vehicle system of FIG. 1) of the E-Turbo may be controlled to ensure that the speed of the exhaust turbine is maintained within a desired turbine speed range (e.g., to increase a useful life of the exhaust turbine). A temperature of the exhaust gas measured at an inlet of the exhaust turbine may be maintained below a threshold turbine temperature, where the threshold turbine temperature is a temperature at or above which the exhaust turbine may degrade. The E-Turbo may be used to control an AFR of the engine, to maximize an efficiency or a power of the engine, or to reduce a level of emissions of the vehicle.

In one example, to maximize the efficiency of the engine while maximizing a remaining useful life of the exhaust turbine, a controller of the vehicle may execute a first control routine. The first control routine may be a non-limiting example of the control routine described above in reference to the method of FIG. 3. The first control routine may be executed in accordance with the timing diagrams of FIGS. 6A-6D, where FIG. 6A, FIG. 6B, FIG. 6C, and FIG. 6D indicate a timing of an action of the controller in response to a first condition, a second condition, a third condition, and a fourth condition, respectively.

FIG. 6A shows an example timing diagram 600, where the horizontal axis (x-axis) denotes time and the vertical markers t0-t3 identify significant times in a sequence of operations of the first control routine under the first condition, where the turbine speed exceeds the threshold turbine speed and the AFR decreases below the first threshold AFR. Timing diagram 600 shows four plots. The first plot, line 602, shows a change in AFR over time, as estimated via an AFR sensor or an $O_2$ sensor (e.g., the AFR and/or $O_2$ sensor 181 and/or 182 of vehicle system 100 of FIG. 1) of the vehicle. A first threshold AFR is indicated by a dashed line 604, and a second threshold AFR is indicated by a dashed line 606, where the first and second threshold AFRs may define a lower limit and an upper limit, respectively, of a desired AFR range within which an efficiency of the engine is maximized and/or emissions are controlled.

The second plot, line 608, shows a speed of an exhaust turbine (e.g., the exhaust turbine of the vehicle system of FIG. 1) of the E-Turbo. A threshold turbine speed is indicated by a dashed line 610, where the threshold turbine speed may define an upper limit of a desired range of turbine speeds. As the speed of the turbine increases, a speed of a compressor of the E-Turbo may increase, providing additional airflow to the engine and thereby reducing the temperature of the exhaust gas. As the turbine speed decreases, a corresponding decrease in compressor speed and airflow to the engine may increase the temperature of the exhaust gas. In one example, the desired turbine speed range is a range within which the temperature of the exhaust gas may be maintained within the desired temperature range. In another example, the desired turbine speed range is a range within which an efficiency of a compressor of the E-Turbo is maximized. In some examples, the threshold turbine speed may represent a turbine speed that, if exceeded, may degrade the turbine and/or result in other system component issues.

The third plot, line 620, shows an amount of power generated by an electric machine (e.g., the electric machine 190 of vehicle system 100 of FIG. 1) coupled to the exhaust turbine. A dashed line 622 shows a baseline amount of power generated by the electric machine, based on a desired baseline compressor speed.

The fourth plot, line 624, shows a power of the engine, where a dashed line 626 shows a commanded power of the engine as commanded by the operator and/or the controller based operating conditions of the engine.

At time t0, the vehicle is operating and the engine is warmed up and operating in a steady state. Between time t0 and time t1, the AFR is between the first threshold AFR and the second threshold AFR, and the speed of the exhaust turbine is below the threshold turbine speed. A commanded power of the engine increases, as shown by line 624. For example, a high-power operation (e.g., notch 8) may be commanded by an operator of the vehicle. As a result of the high-power operation, the exhaust gas may flow through the E-Turbo at an increased rate, causing the turbine speed to increase.

At time t1, line 608 shows the turbine speed increasing above the threshold turbine speed, and line 602 shows the AFR decreasing below the first threshold AFR (e.g., as a result of a filter regeneration). In the first condition, in response to the turbine speed increasing above the threshold turbine speed and the AFR decreasing below the first threshold AFR, the controller derates the engine, resulting in a decreased engine power as shown by line 624.

Between time t1 and t2, the decrease in engine power causes the flow of exhaust gas through the E-Turbo to decrease. The decreased flow of exhaust gas through the turbine begins to reduce the turbine speed. In some examples, decreasing the engine power may a rate of fuel flowing into the engine, thereby increasing the AFR At time t2, the turbine speed falls back below the threshold turbine speed. As a result of the turbine speed falling back below the threshold turbine speed, the engine power is increased to the commanded engine power.

FIG. 6B shows an example timing diagram 630, where the horizontal axis (x-axis) denotes time and the vertical markers t0-t3 identify significant times in a sequence of operations of the first control routine under the second condition, where the turbine speed exceeds the threshold turbine speed and the AFR exceeds the second threshold AFR. Timing diagram 630 shows four plots similar to FIG. 6A, where the first plot, line 632, shows the change in AFR with respect to the first threshold AFR indicated by the dashed line 604 and the second threshold AFR indicated by the dashed line 606; the second plot, line 634, shows the exhaust turbine speed with respect to the threshold turbine speed indicated by a dashed line 610; the third plot, line 636, shows the amount of power generated by the electric machine, with respect to the baseline amount of power indicated by line 622; and the fourth plot, line 638, shows a power of the engine, where a dashed line 626 shows the commanded power of the engine.

At time t0, the vehicle is operating and the engine is warmed up and operating in a steady state. Between time t0 and time t1, the AFR is between the first threshold AFR and the second threshold AFR, and the speed of the exhaust turbine is below the threshold turbine speed.

At time t1, line 634 shows the turbine speed increasing above the threshold turbine speed, and line 632 shows the AFR increasing above the second threshold AFR 606. For example, the increase in the threshold turbine speed and the increase in the AFR may be due to a change in ambient conditions, such as an increase in altitude. In the second condition, in response to the turbine speed increasing above the threshold turbine speed and the AFR increasing above the second threshold AFR, the controller increases the amount of power generated by the electric machine, as shown by line 636.

Between time t1 and t2, the increase in the amount of power generated by the electric machine causes the exhaust turbine speed to decrease. At time t2, the turbine speed falls back below the threshold turbine speed. As a result of the turbine speed falling back below the threshold turbine speed, the amount of power generated by the electric machine increases back up to the baseline amount of power indicated by line 622.

FIG. 6C shows an example timing diagram 660, where the horizontal axis (x-axis) denotes time and the vertical markers t0-t3 identify significant times in a sequence of operations of the first control routine under the third condition, where the turbine speed does not exceed the threshold turbine speed and the AFR exceeds the second threshold AFR. Timing diagram 660 shows four plots similar to FIGS. 6A and 6B, where the first plot, line 662, shows the change in AFR with respect to the first threshold AFR indicated by the dashed line 604 and the second threshold AFR indicated by the dashed line 606; the second plot, line 664, shows the exhaust turbine speed with respect to the threshold turbine speed indicated by a dashed line 610; the third plot, line 666, shows the amount of power generated by the electric machine, with respect to the baseline amount of power indicated by line 622; and the fourth plot, line 668, shows a power of the engine, where a dashed line 626 shows the commanded power of the engine.

At time t0, the vehicle is operating and the engine is warmed up and operating in a steady state. Between time t0 and time t1, the AFR is between the first threshold AFR and the second threshold AFR, and the speed of the exhaust turbine is below the threshold turbine speed.

At time t1, line 662 shows the AFR increasing above the second threshold AFR 606 while line 664 shows the turbine speed being maintained below the threshold turbine speed. In the third condition, in response to the turbine speed not increasing above the threshold turbine speed and the AFR increasing above the second threshold AFR, the controller increases the amount of power generated by the electric machine, as shown by line 666.

Between time t1 and t2, the increase in the amount of power generated by the electric machine causes the AFR to decrease. At time t2, the AFR falls back below the second threshold AFR. As a result of the AFR falling back below the second threshold AFR, the amount of power generated by the electric machine decreases back down to the baseline amount of power indicated by line 622.

FIG. 6D shows an example timing diagram 680, where the horizontal axis (x-axis) denotes time and the vertical markers t0-t3 identify significant times in a sequence of operations of the first control routine under the fourth condition, where the turbine speed does not exceed the threshold turbine speed and the AFR falls below the first threshold AFR. Timing diagram 680 shows four plots similar to FIGS. 6A-6C, where the first plot, line 682, shows the change in AFR with respect to the first threshold AFR indicated by the dashed line 604 and the second threshold AFR indicated by the dashed line 606; the second plot, line 684, shows the exhaust turbine speed with respect to the threshold turbine speed indicated by a dashed line 610; the third plot, line 686, shows the amount of power generated by the electric machine, with respect to the baseline amount of power indicated by line 622; and the fourth plot, line 688, shows a power of the engine, where a dashed line 626 shows the commanded power of the engine.

At time t0, the vehicle is operating and the engine is warmed up and operating in a steady state. Between time t0 and time t1, the AFR is between the first threshold AFR and the second threshold AFR, and the speed of the exhaust turbine is below the threshold turbine speed.

At time t1, line 682 shows the AFR decreasing below the first threshold AFR 606 while line 684 shows the turbine speed being maintained below the threshold turbine speed. In the fourth condition, in response to the turbine speed not increasing above the threshold turbine speed and the AFR decreasing below the second threshold AFR, the controller decreases the amount of power generated by the electric machine, as shown by line 686.

Between time t1 and t2, the decrease in the amount of power generated by the electric machine causes the AFR to increase. At time t2, the AFR increases back up above the first threshold AFR. As a result of the AFR increasing back up above the first threshold AFR, the amount of power generated by the electric machine increases back up to the baseline amount of power indicated by line 622.

Thus, the electric machine may be operated to increase or decrease the amount of power generated by the electric machine based on the AFR and the turbine speed, (for example, to maximize a remaining useful life of the turbine by not allowing it to exceed a maximum speed) while maximizing a performance of the engine (e.g., by maintaining the AFR within the threshold range). In another example, to maximize the remaining useful life of the exhaust turbine, a controller of the vehicle may execute a second control routine. The second control routine may be a non-limiting example of the control routine described above in reference to the method of FIG. 4. The second control routine may be executed in accordance with the timing diagrams of FIGS. 7A-7B, where FIG. 7A and FIG. 7B indicate a timing of an action of the controller in response to a first condition and a second condition respectively.

FIG. 7A shows an example timing diagram 700, where the horizontal axis (x-axis) denotes time and the vertical markers t0-t3 identify significant times in a sequence of operations of the second control routine under the first condition, where a temperature of exhaust gas at an inlet of an exhaust turbine (e.g., the exhaust turbine 123 of vehicle system 100 of FIG. 1) of an E-Turbo of a vehicle exceeds a threshold turbine temperature and a speed of the exhaust turbine exceeds a threshold turbine speed. Timing diagram 700 shows four plots. The first plot, line 702, shows a change in turbine inlet temperature over time, as estimated via a temperature sensor (e.g., temperature sensor 125 of vehicle system 100 of FIG. 1) of the vehicle positioned upstream of the exhaust turbine. A threshold turbine temperature is indicated by a dashed line 704, where the threshold turbine temperature may define a temperature above which the exhaust turbine may degrade rapidly.

The second plot, line 708, shows a speed of the exhaust turbine of the E-Turbo. A threshold turbine speed is indicated by a dashed line 710, where the threshold turbine speed may define an upper limit of a desired range of turbine speeds. In one example, the desired turbine speed range is a range within which the temperature of the exhaust gas may be maintained within the desired temperature range. In another example, the desired turbine speed range is a range within which an efficiency of a compressor of the E-Turbo is maximized.

The third plot, line 720, shows an amount of power generated by an electric machine (e.g., the electric machine 190 of vehicle system 100 of FIG. 1) coupled to the exhaust turbine. A dashed line 722 shows a baseline amount of power generated by the electric machine, based on a desired baseline compressor speed.

The fourth plot, line 724, shows a power of an engine of the vehicle, where a dashed line 726 shows the power of the engine during commanded operating conditions of the engine.

At time t0, the vehicle is operating and the engine is warmed up and operating in a steady state. Between time t0 and time t1, the turbine inlet temperature is below the threshold turbine temperature, and the speed of the exhaust turbine is below the threshold turbine speed. A commanded power of the engine increases, as shown by line 724. For example, a high-power operation (e.g., notch 8) may be commanded by an operator of the vehicle. As a result of the commanded increase in power, the exhaust gas may flow through the E-Turbo at an increased rate, causing the turbine inlet temperature to increase. Additionally, the commanded increase in power may also cause an AFR of the engine to decrease (not shown in FIG. 7A), which may also increase the turbine inlet temperature.

At time t1, line 708 shows the turbine speed increasing above the threshold turbine speed, and line 702 shows the turbine inlet temperature increasing above the threshold turbine temperature. In the first condition, in response to the turbine speed increasing above the threshold turbine speed and the turbine inlet temperature increasing above the threshold turbine temperature, the controller derates the engine, resulting in a decreased engine power as shown by line 724.

Between time t1 and t2, the decrease in engine power causes the flow of exhaust gas through the E-Turbo to decrease. The decreased flow of exhaust gas through the turbine begins to reduce the turbine inlet temperature and the turbine speed. At time t2, the turbine inlet temperature falls back below the threshold turbine temperature and the turbine speed falls back below the threshold turbine speed. As a result of the turbine inlet temperature falling back below the threshold turbine temperature and the turbine speed falling back below the threshold turbine speed, the engine power is increased to the commanded engine power.

FIG. 7B shows an example timing diagram 730, where the horizontal axis (x-axis) denotes time and the vertical markers t0-t3 identify significant times in a sequence of operations of the second control routine under the second condition, where the temperature of the exhaust gas at the inlet of an exhaust turbine exceeds the threshold turbine temperature when the speed of the exhaust turbine does not exceed the threshold turbine speed. Similar to timing diagram 700, timing diagram 730 shows four plots, where the first plot, line 732, shows the change in turbine inlet temperature over time with respect to a threshold turbine temperature indicated by the dashed line 704, and the second plot, line 734, shows the speed of the exhaust turbine with respect to a threshold turbine speed indicated by the dashed line 710.

At time t0, the vehicle is operating and the engine is warmed up and operating in a steady state. Between time t0 and time t1, the turbine inlet temperature is below the threshold turbine temperature, and the speed of the exhaust turbine is below the threshold turbine speed. A commanded power of the engine increases, as shown by line 738.

At time t1, line 732 shows the turbine inlet temperature increasing above the threshold turbine temperature, while line 734 shows the turbine speed being maintained below the threshold turbine speed. In the second condition, in response to the turbine inlet temperature increasing above the threshold turbine temperature and the turbine speed not increasing above the threshold turbine speed, the controller decreases the amount of power generated by the electric machine.

Between time t1 and t2, the decrease in amount of power generated by the electric machine causes the turbine inlet temperature to decrease (e.g., as a result of an increase in turbine speed). At time t2, the turbine inlet temperature falls back below the threshold turbine temperature. As a result of the turbine inlet temperature falling back below the threshold turbine temperature, the controller increases the amount of power generated by the electric machine.

In yet another example, a controller of the vehicle may execute a third control routine to control a temperature of the exhaust gases downstream of the E-Turbo, as the gases enter an aftertreatment device of the vehicle. As described above, by controlling the temperature of the exhaust gases in the aftertreatment device, an emissions level of the vehicle may be minimized. The third control routine may be a nonlimiting example of the control routine described above in reference to the method of FIG. 5. The third control routine may be executed in accordance with the timing diagrams of FIGS. 8A-8B, where FIG. 8A and FIG. 8B indicate a timing of an action of the controller in response to a first condition and a second condition, respectively.

FIG. 8A shows an example timing diagram 800, where the horizontal axis (x-axis) denotes time and the vertical markers t0-t3 identify significant times in a sequence of operations of the third control routine under the first condition, where a temperature of exhaust gas at the inlet of the aftertreatment system (e.g., an aftertreatment device of the aftertreatment system of the vehicle system of FIG. 1) decreases below a threshold aftertreatment temperature while an AFR of an engine of the vehicle is maintained above a threshold AFR. Timing diagram 800 shows four plots. The first plot, line 802, shows a change in aftertreatment temperature over time, as estimated via a temperature sensor (e.g., temperature sensor 115 of vehicle system 100 of FIG. 1) of the vehicle positioned upstream of the aftertreatment device (e.g., at the inlet). A first threshold aftertreatment temperature is indicated by a dashed line 804, and a second threshold aftertreatment temperature is indicated by a dashed line 806, where the and second threshold aftertreatment temperatures may define a temperature range within which the level of emissions of the vehicle is minimized.

The second plot, line 808, shows an AFR of the engine. A threshold AFR is indicated by a dashed line 810, where the threshold AFR may define a lower limit of a desired AFR range. In one example, the desired AFR range is a range within which an efficiency of the engine is maximized.

The third plot, line 812, shows a speed of the exhaust turbine of the E-Turbo. A threshold turbine speed is indicated by a dashed line 814, where the threshold turbine speed may define an upper limit of a desired range of turbine speeds (e.g., to maximize a performance of a compressor of the E-Turbo, to maximize a remaining useful life of the turbine, etc.).

The fourth plot, line 820, shows an amount of power generated by an electric machine (e.g., the electric machine of the vehicle system of FIG. 1) coupled to an exhaust turbine of an E-Turbo. A dashed line 822 shows a baseline amount of power generated by the electric machine, based on a desired baseline compressor speed.

At time t0, the vehicle is operating and the engine is warmed up and operating in a steady state. Between time t0 and time t1, the aftertreatment temperature is between the first threshold aftertreatment temperature and the second threshold aftertreatment temperature, the turbine speed is below the threshold turbine speed, and the AFR is above the threshold AFR.

At time t1, line 802 shows the aftertreatment temperature decreasing below the first threshold aftertreatment temperature (e.g., as a result of a decrease in engine power), while line 808 shows the AFR being maintained above the threshold AFR. In the first condition, in response to the aftertreatment temperature decreasing below the first threshold aftertreatment temperature and the AFR being maintained above the threshold AFR, a controller of the vehicle increases the amount of power generated by the electric machine, as shown by line 820.

Between time t1 and t2, the increase in the amount of power generated by the electric machine results in a decreased turbine speed. As a result of the decreased turbine speed, a decrease in power supplied to the compressor causes a slightly delayed increase in the temperature of the exhaust gas, which is registered at the aftertreatment device (e.g., the aftertreatment temperature). At time t2, the aftertreatment temperature increases above the first threshold aftertreatment temperature. As a result of the aftertreatment temperature increasing above the first threshold aftertreatment temperature, the controller decreases the amount of power generated by the electric machine, as shown by line 820.

FIG. 8B shows an example timing diagram 830, where the horizontal axis (x-axis) denotes time and the vertical markers t0-t3 identify significant times in a sequence of operations of the third control routine under the second condition, where the temperature of exhaust gas at the inlet of the aftertreatment system increases above the second threshold aftertreatment temperature. Timing diagram 830 shows three plots. Similar to timing diagram 800, the first plot, line 832, shows a change in aftertreatment temperature over time, with respect to the first threshold aftertreatment temperature indicated by the dashed line 804 and the second threshold aftertreatment temperature indicated by the dashed line 806; the second plot, line 834, shows the turbine speed with respect to the dashed line 814 showing the threshold turbine speed; and the third plot, line 836, shows the amount of power generated by an electric machine with respect to the dashed line 822 showing the baseline amount of power generated by the electric machine.

At time t0, the vehicle is operating and the engine is warmed up and operating in a steady state. Between time t0 and time t1, the aftertreatment temperature is between the first threshold aftertreatment temperature and the second threshold aftertreatment temperature, and the turbine speed is below the threshold turbine speed.

At time t1, line 832 shows the aftertreatment temperature increasing above the second threshold aftertreatment temperature. For example, a temperature of an environment of the vehicle may increase (e.g., operating in a tunnel, etc.) In the second condition, in response to the aftertreatment temperature increasing above the second threshold aftertreatment temperature, the controller decreases the amount of power generated by the electric machine, as shown by line 836.

Between time t1 and t2, the decrease in the amount of power generated by the electric machine results in an increased turbine speed. An increased flow of exhaust gas out of the turbine and through the aftertreatment device begins to decrease (e.g., cool) the temperature of the exhaust gas prior to reaching the inlet of the aftertreatment device (e.g., the aftertreatment temperature), as heat generated by the engine is transferred to the increased flow of exhaust gas at a higher rate. At time t2, the aftertreatment temperature decreases back below the second threshold aftertreatment temperature. As a result of the aftertreatment temperature decreasing below the second threshold aftertreatment temperature, the controller increases the amount of power generated by the electric machine back to a baseline level, as shown by line 836.

Thus, a performance of an exhaust system of a vehicle may be maximized by controlling a plurality of parameters of the exhaust system via an E-Turbo of the exhaust system, the E-Turbo having an electric machine coupled to an exhaust turbine. By adjusting an amount of power generated by the electric machine, a speed of the exhaust turbine may be decreased or increased. When the speed of the exhaust turbine is decreased, the compressor slows down, thereby increasing a temperature of the exhaust gases. When the speed of the exhaust turbine is increased, the compressor speeds up, generating more airflow during combustion and decreasing the temperature of the exhaust gases. By operating the electric machine to increase or decrease the amount of power generated by the electric machine based on different operating conditions, an AFR of the engine, the temperature of the exhaust gases in the turbine and in the aftertreatment system, and the turbine speed may be maintained within desired parameter ranges. In this way, efficiencies and useful lives of the engine, the turbine, the aftertreatment system, and an overall efficiency of the vehicle may be increased. Additionally, by maintaining the temperature of the exhaust gases in the aftertreatment system within a desired temperature range, a level of emissions of the vehicle may be reduced.

The technical effect of controlling the speed of the turbine via the electric machine is that remaining useful lives of components of the exhaust system may be increased and emissions may be reduced while maximizing an efficiency of the engine.

The disclosure also provides support for a method, comprising: increasing a power generated by an electric machine mechanically coupled with an exhaust turbine of an E-Turbo of a vehicle or adjusting an engine power based on a speed of the exhaust turbine and an air-fuel ratio (AFR) of an engine of the vehicle of the engine responsive to the speed of the exhaust turbine increasing above a threshold turbine speed. In a first example of the method, increasing the power generated by the electric machine and/or adjusting the engine power based on the speed of the exhaust turbine and the AFR further comprises: responsive to the AFR being below a first threshold AFR, adjusting an engine operation to reduce an air flow rate of exhaust gases through the E-Turbo, and responsive to the AFR not being below the first threshold AFR, increasing the power generated by the electric machine to decrease the speed of the exhaust turbine. In a second example of the method, optionally including the first example, the method further comprises: responsive to the AFR being below a first threshold AFR, maintaining the engine power and advancing a combustion timing of the engine, and responsive to the AFR not being below the first threshold AFR, increasing the power generated by the electric machine to decrease the speed of the exhaust turbine. In a third example of the method, optionally including one or both of the first and second examples, the method further comprises: responsive to the speed of the exhaust turbine not increasing above the threshold turbine speed, increasing or decreasing the power generated by the electric machine based on the AFR. In a fourth example of the method, optionally including one or more or each of the first through third examples, increasing or decreasing the power generated by the electric machine based on the AFR further comprises: decreasing the power generated by the electric machine to increase the speed of the exhaust turbine and increase the AFR responsive to the AFR being below a first threshold AFR, and increasing the power generated by the electric machine to decrease the speed of the exhaust turbine and reduce the AFR responsive to the AFR being above a second threshold AFR, the second threshold AFR being higher than the first threshold AFR. In a fifth example of the method, optionally including one or more or each of the first through fourth examples, the method further comprises: operating the electric machine in a motor mode to increase the speed of the exhaust turbine under a first condition responsive to the AFR being below the first threshold AFR. In a sixth example of the method, optionally including one or more or each of the first through fifth examples, the method further comprises: only decreasing the power generated by the electric machine and never operating the electric machine in a motor mode to increase the speed of the exhaust turbine under a second condition, responsive to the AFR being below the first threshold AFR. In a seventh example of the method, optionally including one or more or each of the first through sixth examples, at least one of the threshold turbine speed, the first threshold AFR, and the second threshold AFR are based on at least one of: a level of emissions of the vehicle, an efficiency of the engine, a demand for power delivered by the electric machine, an amount of power recovered from a combustion of fuel during fuel injection, where an amount of heat generated by the fuel injection exceeds a demand for heat, and a rate of degeneration of one or more components of the vehicle. In an eighth example of the method, optionally including one or more or each of the first through seventh examples, the vehicle includes a wastegate coupled to the exhaust turbine, and at least one of the threshold turbine speed, the first threshold AFR, and/or the second threshold AFR are adjusted based on a detection of a signal sent to actuate the wastegate and/or an actuation of the wastegate. In a ninth example of the method, optionally including one or more or each of the first through eighth examples, the increased power generated by the electric machine is used for at least one of charging an energy storage device of the vehicle, operating an auxiliary device of the vehicle, and powering one or more wheels of the vehicle. In a tenth example of the method, optionally including one or more of each of the first through ninth examples, the method further comprises adjusting the engine power the engine is operating at a warmed-up steady operating setpoint.

The disclosure also provides support for a method, comprising: adjusting an engine operation or adjusting a power generated by an electric machine coupled with an exhaust turbine of a vehicle having an engine based on a speed of the exhaust turbine, responsive to a temperature of exhaust gases upstream of the exhaust turbine increasing above a threshold temperature. In a first example of the method, adjusting the power generated by the electric machine based on the speed of the exhaust turbine further comprises: derating the engine responsive to the speed of the exhaust turbine being above a threshold turbine speed, and decreasing the power generated by the electric machine to increase the speed of the exhaust turbine responsive to the speed of the exhaust turbine not being above the threshold turbine speed. In a second example of the method, optionally including the first example, a portion of the exhaust gases generated by the engine are flowed back to an intake of the engine via an exhaust gas recirculation (EGR) system of the vehicle at an EGR flow rate, and the EGR flow rate is controlled in conjunction with operating the electric machine to maintain an air-fuel ratio (AFR) above a threshold AFR while controlling turbine speed.

The disclosure also provides support for a system of a vehicle, comprising: a turbocharger, comprising a compressor and an exhaust turbine coupled to the compressor, an electric machine mechanically coupled to the turbocharger, an exhaust gas aftertreatment device connected to an outlet of the exhaust turbine, and a controller including a processor and instructions stored on a non-transient memory of the controller that when executed cause the controller to: respond to a temperature of exhaust gases at an inlet of the exhaust gas aftertreatment device decreasing below a first threshold temperature and an air-fuel ratio (AFR) of an engine not decreasing below a threshold AFR, by increasing a power generated by the electric machine to decrease a speed of the exhaust turbine and increase the temperature of the exhaust gases. In a first example of the system, responding to the temperature of the exhaust gases at the inlet of the exhaust gas aftertreatment device decreasing below the first threshold temperature and the AFR of the engine not decreasing below the threshold AFR by increasing the power generated by the electric machine further comprises increasing the power generated by the electric machine during each warmed-up steady engine operating setpoint. In a second example of the system, optionally including the first example, further instructions are stored on the non-transient memory of the controller that when executed cause the controller to: responsive to the temperature of the exhaust gases upstream of the exhaust gas aftertreatment device increasing above a second threshold temperature, decreasing a power generated by the electric machine during each warmed-up steady engine operating setpoint to increase the speed of the exhaust turbine and decrease the temperature of the exhaust gases. In a third example of the system, optionally including one or both of the first and second examples, decreasing the power generated by the electric machine to increase the speed of the exhaust turbine and decrease the temperature of the exhaust gases further comprises operating the electric machine in a motor mode to further increase the speed of the exhaust turbine. In a fourth example of the system, optionally including one or more or each of the first through third examples, decreasing the power generated by the electric machine to increase the speed of the exhaust turbine and decrease the temperature of the exhaust gases further comprises only decreasing the power generated by the electric machine and never operating the electric machine in a motor mode to increase the speed of the exhaust turbine. In a fifth example of the system, optionally including one or more or each of the first through fourth examples, at least one of the first threshold temperature, the second threshold temperature, and/or the threshold AFR are based on at least one of: a level of emissions of the vehicle, an efficiency of the engine, a demand for power delivered by the electric machine, an amount of power recovered from a combustion of fuel during fuel injection, where an amount of heat generated by the fuel injection exceeds a demand for heat, and a rate of degeneration of one or more components of the vehicle. In a sixth example of the system, optionally including one or more or each of the first through fifth examples, the system further comprises: an exhaust gas recirculation (EGR) system wherein a portion of the exhaust gases generated by the engine are flowed back to an intake of the engine at an EGR flow rate, and wherein the EGR flow rate is controlled in conjunction with operating the electric machine in order to maintain the temperature of the exhaust gases within a desired temperature range. In a seventh example of the system, optionally including one or more or each of the first through sixth examples, the vehicle is a locomotive.

The disclosure also provides support for a method for controlling a vehicle, comprising: in response to a speed of an exhaust turbine increasing above a threshold turbine speed, executing a first control routine to adjust an amount of power generated by an electric machine mechanically coupled to the exhaust turbine, in response to a temperature of exhaust gases upstream of the exhaust turbine increasing above a threshold temperature, executing a second control routine to adjust the amount of power generated by the electric machine, and in response to the temperature of the exhaust gases at an inlet of an aftertreatment device arranged downstream from the exhaust turbine increasing above a first threshold aftertreatment temperature or decreasing below a second threshold aftertreatment temperature, executing a third control routine to adjust the amount of power generated by the electric machine. In a first example of the method, executing the first control routine further comprises: in response to the speed of the exhaust turbine increasing above the threshold turbine speed and an AFR of the engine being below a first threshold AFR, adjusting an operation of the engine, in response to the speed of the exhaust turbine increasing above the threshold turbine speed and the AFR increasing above a second threshold AFR, increasing the amount of power generated by the electric machine, in response to the speed of the exhaust turbine not increasing above the threshold turbine speed and the AFR being below the first threshold AFR, decreasing the amount of power generated by the electric machine. In a second example of the method, optionally including the first example, executing the second control routine further comprises: in response to the temperature of the exhaust gases upstream of the exhaust turbine increasing above the threshold temperature and the speed of the exhaust turbine being above the threshold turbine speed, adjusting an operation of the engine, in response to the temperature of the exhaust gases upstream of the exhaust turbine increasing above the threshold temperature and the speed of the exhaust turbine not increasing above the threshold turbine speed, decreasing the amount of power generated by the electric machine. In a third example of the method, optionally including one or both of the first and second examples, executing the third control routine further comprises: in response to the temperature of the exhaust gases at the inlet of the aftertreatment device decreasing below the first threshold temperature and the AFR not being below a threshold AFR, increasing the amount of power generated by the electric machine, and in response to the temperature of the exhaust gases at the inlet of the aftertreatment system increasing above the second threshold aftertreatment temperature, decreasing the amount of power generated by the electric machine. In a fourth example of the method, optionally including one or more or each of the first through third examples, the first control routine, the second control routine, and the third control routine are executed to control at least one of: a temperature of the exhaust gases at the inlet of the aftertreatment device, an efficiency of the engine, a demand for power delivered by the electric machine, an amount of power recovered from a combustion of fuel during post fuel injection, where an amount of heat generated by the post fuel injection exceeds a demand for heat, and a rate of degeneration of one or more components of the aftertreatment device.

The disclosure also provides support for a control system of a vehicle having an engine, comprising: an engine, a turbocharger, comprising a turbine coupled to a compressor, an electrical machine coupled to the turbocharger and operable either in a motor mode to input mechanical energy into the turbocharger or in a generator mode to extract mechanical energy from the turbocharger, an aftertreatment device connected to an outlet of the turbine, and a controller including a processor and instructions stored on a non-transient memory of the controller that when executed cause the controller to: in response to a first condition, input a mechanical energy into the turbine or decrease an amount of mechanical energy extracted from exhaust gases of the engine via the turbine, in response to a second condition, increase the amount of mechanical energy extracted from the exhaust gases via the turbine, and in response to a third condition, adjust one or more operating conditions of the engine. In a first example of the system, the controller receives an air fuel ratio (AFR) of the engine, a temperature of exhaust gases of the engine upstream of the turbine, a temperature of the exhaust gases at an inlet of the aftertreatment device, and a speed of the turbine as inputs, and outputs a control signal to the electric machine. In a second example of the system, optionally including the first example, the first condition includes at least one of: the speed of the turbine not increasing above a threshold turbine speed and the AFR decreasing below a first threshold AFR, the temperature of the exhaust gases upstream of the turbine increasing above a threshold turbine temperature and the speed of the turbine not increasing above the threshold turbine speed, and the temperature of the exhaust gases at the inlet of the aftertreatment device increasing above a second threshold aftertreatment temperature. In a third example of the system, optionally including one or both of the first and second examples, the second condition includes at least one of: the speed of the turbine increasing above the threshold turbine speed and the AFR not being below the first threshold AFR, the speed of the turbine not increasing above the threshold turbine speed and the AFR being above the second threshold AFR, and the temperature of the exhaust gases at the inlet of the aftertreatment device decreasing below the first threshold aftertreatment temperature and the AFR not being below the first threshold AFR. In a fourth example of the system, optionally including one or more or each of the first through third examples, the third condition includes at least one of: the speed of the turbine increasing above the threshold turbine speed and the AFR being below the first threshold AFR, and the temperature of the exhaust gases at the inlet of the exhaust turbine increasing above the threshold turbine temperature and the speed of the turbine increasing above the threshold turbine speed.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system of a vehicle, comprising:
    a turbocharger, comprising a compressor and an exhaust turbine coupled to the compressor;
    an electric machine mechanically coupled to the turbocharger;
    an engine having an exhaust gas aftertreatment device connected to an outlet of the exhaust turbine; and
    a controller including a processor and instructions stored in a memory of the controller that when executed cause the controller to:
        respond to turbine speed above a threshold, by selecting among adjusting power generated by the electric machine and adjusting engine operation based on an air-fuel ratio (AFR) of the engine relative to a first AFR threshold to control turbine speed; and
        respond to turbine speed below the threshold, a temperature of exhaust gases at an inlet of the exhaust gas aftertreatment device decreasing below a first threshold temperature, and an air-fuel ratio (AFR) of an engine not decreasing below a second AFR threshold, by increasing a power generated by the electric machine to decrease a speed of the exhaust turbine and increase the temperature of the exhaust gases.

2. The system of claim 1, further comprising an exhaust gas recirculation (EGR) system wherein a portion of the exhaust gases generated by the engine are flowed back to an intake of the engine at an EGR flow rate, and wherein the EGR flow rate is controlled in conjunction with operating the electric machine in order to maintain the temperature of the exhaust gases within a desired temperature range.

3. The system of claim 1, wherein responding to the temperature of the exhaust gases at the inlet of the exhaust gas aftertreatment device decreasing below the first threshold temperature and the AFR of the engine not decreasing below the second AFR threshold by increasing the power generated by the electric machine further comprises increasing the power generated by the electric machine during each warmed-up steady engine operating setpoint.

4. The system of claim 3, wherein further instructions are stored on the non-transient memory of the controller that when executed cause the controller to:
    responsive to the temperature of the exhaust gases upstream of the exhaust gas aftertreatment device increasing above a second threshold temperature, decreasing a power generated by the electric machine during each warmed-up steady engine operating setpoint to increase the speed of the exhaust turbine and decrease the temperature of the exhaust gases.

5. The system of claim 4, wherein decreasing the power generated by the electric machine to increase the speed of the exhaust turbine and decrease the temperature of the exhaust gases further comprises operating the electric machine in a motor mode to further increase the speed of the exhaust turbine.

6. The system of claim 4, wherein at least one of the first threshold temperature, the second threshold temperature, and/or the threshold AFR are based on at least one of:
    a level of emissions of the vehicle;
    an efficiency of the engine;
    a demand for power delivered by the electric machine;
    an amount of power recovered from a combustion of fuel during fuel injection, where an amount of heat generated by the fuel injection exceeds a demand for heat; and
    a rate of degeneration of one or more components of the vehicle.

7. A system of a vehicle, comprising:
    a turbocharger, comprising a compressor and an exhaust turbine coupled to the compressor;
    an electric machine mechanically coupled to the turbocharger;
    an exhaust gas aftertreatment device connected to an outlet of the exhaust turbine; and
    a controller including a processor and instructions stored in a memory of the controller that when executed cause the controller to:
        respond to a temperature of exhaust gases at an inlet of the exhaust gas aftertreatment device decreasing below a first threshold temperature and an air-fuel ratio (AFR) of an engine not decreasing below a threshold AFR, by increasing a power generated by the electric machine to decrease a speed of the exhaust turbine and increase the temperature of the exhaust gases, wherein responding to the temperature of the exhaust gases at the inlet of the exhaust gas aftertreatment device decreasing below the first threshold temperature and the AFR of the engine not decreasing below the threshold AFR by increasing the power generated by the electric machine further comprises increasing the power generated by the electric machine during each warmed-up steady engine operating setpoint; and wherein further instructions are stored on the non-transient memory of the controller that when executed cause the controller to:
responsive to the temperature of the exhaust gases upstream of the exhaust gas aftertreatment device increasing above a second threshold temperature, decreasing a power generated by the electric machine during each warmed-up steady engine operating setpoint to increase the speed of the exhaust turbine and decrease the temperature of the exhaust gases, wherein decreasing the power generated by the electric machine to increase the speed of the exhaust turbine and decrease the temperature of the exhaust gases further comprises only decreasing the power generated by the electric machine and never operating the electric machine in a motor mode to increase the speed of the exhaust turbine.

8. A system of a vehicle, comprising:
a turbocharger, comprising a compressor and an exhaust turbine coupled to the compressor;
an electric machine mechanically coupled to the turbocharger;
an engine having an exhaust gas aftertreatment device connected to an outlet of the exhaust turbine; and
a controller including a processor and instructions stored in a memory of the controller that when executed cause the controller to:
respond to turbine speed above a threshold, by selecting among adjusting power generated by the electric machine and adjusting engine operation based on an air-fuel ratio (AFR) of the engine relative to a first AFR threshold to control turbine speed;
respond to turbine speed below the threshold and a temperature of exhaust gases at an inlet of the turbine greater than a turbine temperature threshold by selecting among adjusting power generated by the electric machine and adjusting engine operation based on turbine speed relative to a second speed threshold; and
respond to turbine speed below the threshold, a temperature of exhaust gases at an inlet of the exhaust gas aftertreatment device decreasing below a first threshold temperature, and an air-fuel ratio (AFR) of an engine not decreasing below a second AFR threshold, by increasing a power generated by the electric machine to decrease a speed of the exhaust turbine and increase the temperature of the exhaust gases.

* * * * *